US012222000B2

(12) United States Patent
Hoshi

(10) Patent No.: US 12,222,000 B2
(45) Date of Patent: Feb. 11, 2025

(54) SLIDING LINEAR MOTION GUIDE DEVICE AND METHOD FOR ATTACHING SLIDING MEMBER TO CARRIAGE OF SLIDING LINEAR MOTION GUIDE DEVICE

(71) Applicant: MAKINO MILLING MACHINE CO., LTD., Tokyo (JP)

(72) Inventor: Yoshio Hoshi, Kanagawa (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 204 days.

(21) Appl. No.: 17/640,766

(22) PCT Filed: Sep. 4, 2020

(86) PCT No.: PCT/JP2020/033665
§ 371 (c)(1),
(2) Date: Mar. 4, 2022

(87) PCT Pub. No.: WO2021/045213
PCT Pub. Date: Mar. 11, 2021

(65) Prior Publication Data

US 2022/0307551 A1 Sep. 29, 2022

(30) Foreign Application Priority Data

Sep. 6, 2019 (JP) ................................ 2019-163282

(51) Int. Cl.
*F16C 29/02* (2006.01)

(52) U.S. Cl.
CPC .................................. *F16C 29/02* (2013.01)

(58) Field of Classification Search
CPC ...... F16C 29/005; F16C 29/02; F16C 29/025; F16C 43/02
See application file for complete search history.

(56) References Cited

U.S. PATENT DOCUMENTS 4,978,233 A * 12/1990 Stotzel .................... F16C 32/06 384/42
5,267,796 A 12/1993 Nonaka et al.
(Continued)

FOREIGN PATENT DOCUMENTS

CN 101561012 A 10/2009
DE 1010805 B 6/1957
(Continued)

OTHER PUBLICATIONS

Translation of DE102016208916 obtained Nov. 20, 2023.*
Search Report for European Patent Application No. 20860815.8 (Sep. 8, 2023).

*Primary Examiner* — James Pilkington
(74) *Attorney, Agent, or Firm* — Merchant & Gould P.C.

(57) ABSTRACT

A sliding linear motion guide device that is to be provided between a supporting body and a movable body is provided with: a rail (300) having a first guiding surface (302) and second guiding surfaces (304, 306) which are inclined; a carriage (200) having a receiving recess for receiving at least part of the rail and having a first sliding surface (204) facing the first guiding surface of the rail and second sliding surfaces (206, 208) facing the respective second guiding surfaces; and sliding members (10) each of which is a thin plate attached to one of the sliding surfaces. The sliding members each have a lubricant pocket (14) which is a recess surrounded by a land part (12).

6 Claims, 33 Drawing Sheets

(56) References Cited

U.S. PATENT DOCUMENTS

| | | | | |
|---|---|---|---|---|
| 5,980,110 | A * | 11/1999 | Lyon | F16C 29/025 384/12 |
| 6,012,845 | A * | 1/2000 | Lyon | F16C 32/064 384/12 |
| 6,247,845 | B1 | 6/2001 | Pedrazzini et al. | |
| 11,131,342 | B2 * | 9/2021 | Hoshi | B23Q 11/124 |
| 2003/0217652 | A1 | 11/2003 | Hisanobu et al. | |
| 2009/0263055 | A1 | 10/2009 | Klein et al. | |
| 2019/0085901 | A1 | 3/2019 | Ament et al. | |
| 2020/0318682 | A1 | 10/2020 | Spatschek et al. | |
| 2021/0025449 | A1 | 1/2021 | Hoshi et al. | |

FOREIGN PATENT DOCUMENTS

| | | | |
|---|---|---|---|
| DE | 102016208916 | A1 | 11/2017 |
| JP | 2013-091142 | A | 5/2013 |
| JP | 2019-052757 | A | 4/2019 |
| WO | 2019/053895 | A1 | 3/2019 |

* cited by examiner

SLIDING LINEAR MOTION GUIDE DEVICE AND METHOD FOR ATTACHING SLIDING MEMBER TO CARRIAGE OF SLIDING LINEAR MOTION GUIDE DEVICE

CITATION TO RELATED APPLICATIONS

This application is a National Stage Application of PCT/JP2020/033665 filed Sep. 4, 2020, which claims benefit of priority to Japanese Patent Application No. 2019-163282, filed Sep. 6, 2019, which applications are incorporated herein by reference. To the extent appropriate, a claim of priority is made to each of the above disclosed applications.

FIELD

The present invention relates to a sliding linear motion guide device which is attached, for example, between a moving body such as a table or spindle head of a machine tool and a support body such as a bed or column supporting the moving body. The present invention further relates to a method for adhering a sliding member to a carriage attached to the moving body side of the sliding linear motion guide device.

BACKGROUND

In guide devices used for in the feed shafts of a machine tool, the sliding surfaces of the moving body are guided on the guiding surfaces of the support body, and the moving body is moved by the shaft feed device. In general, in such guide devices, a dynamic pressure slip guide method, a static pressure slip guide method, or a partial load compensation slip guide method is utilized. The present invention relates to a guiding device for a moving body by the partial load compensation slip guiding method.

Patent Literature 1 describes a moving body guide device in which a sliding member is adhered to a moving body, and the sliding member is guided while contacting the guiding surface of the support body. In this guide device, a lubricant return passage which is open on the sliding surface and a lubricant supply passage and lubricant discharge passage which communicate with the lubricant return passage are provided in the moving body, lubricant is supplied from a lubricant source to the sliding surface via the lubricant supply passage while the lubricant is returned between the sliding surface and the lubricant return passage along with the movement of the moving body, and the lubricant is discharged from the sliding surface to the outside via the lubricant discharge passage.

PATENT LITERATURE

[PTL 1 Japanese Unexamined Patent Publication (Kokai) No. 2013-091142

SUMMARY

Technical Problem

In the guide device of Patent Literature 1, the sliding member is directly attached to the moving body and the guiding surface is formed directly on the support body. Adhering a sliding member to a moving body such as the table or spindle head of a machine tool or forming a passage for lubricating oil in the table or spindle head, which is a moving body, is a difficult problem. In this respect, if guide members can be attached to a moving body and support body as a unit, as in a rolling linear motion guide, the handling will be improved, but in a general rolling linear motion guide using a ball, there is a problem in that the ball generates vibration and noise due to the rolling thereof.

The present invention aims to solve such problems of the prior art, and an object of the present invention is to provide a sliding linear motion guide device with improved load bearing, straightness, and damping, as well as vibration damping and quietness, while taking advantage of the compactness and ease of handling of rolling linear motion guides.

Solution to Problem

In order to achieve the above object, according to the present invention, there is provided a sliding linear motion guide device which is attached between a support body and a moving body, the device comprising a rail which extends in a movement direction of the moving body and which comprises at least a first guiding surface extending in the movement direction and two second guiding surfaces which are provided inclined with respect to the first guiding surface and which extend in the movement direction, a carriage which is capable of reciprocating in the movement direction and which has a receiving recess for receiving at least a part of the rail, the carriage comprising a first sliding surface facing the first guiding surface of the rail when a part of the rail is received in the receiving recess, and two second sliding surfaces which face the respective two second guiding surfaces, a thin plate-shaped sliding member which is adhered to one of the sliding surfaces, the sliding members each having a lubricant pocket composed of a recess having a perimeter surrounded by a land part, and a plurality of convex parts which contact the first and second guiding surfaces of the rail when a part of the rail is received in the receiving recess being formed in the lubricant pockets, a first passage formed in the carriage so as to be open into the lubricant pocket at one end of the sliding member in a reciprocation direction of the carriage, and a second passage formed in the carriage so as to be open into the lubricant pocket on the side opposite the one end into which the first passage is open in the lubricant pocket of the sliding member.

Further, according to the present invention, there is further provided a method for adhering the sliding member to the carriage of the sliding linear motion guide device, the method comprising the steps of preparing a first jig having a first pressing surface provided so as to be capable of facing the first sliding surface of the carriage and having a positioning recess formed for receiving and positioning the sliding member, arranging the sliding member in the positioning recess so that a rear surface of the sliding member protrudes from the positioning recess, applying an adhesive to the rear surface of the sliding member, arranging the first pressing surface of the first jig so as to face the first sliding surface of the carriage, pressing the rear surface of the sliding member in the positioning recess against the first sliding surface by affixing the first jig to the carriage with a bolt, and loosening the bolt after the adhesive has hardened and removing the first jig from the carriage.

According to the present invention, there is further provided a method for adhering the sliding members to the carriage of the sliding linear motion guide device, the method comprising preparing a first jig having a first pressing surface provided so as to be capable of facing the first sliding surface of the carriage and having a positioning recess formed for receiving and positioning the sliding member, arranging the sliding member in the positioning recess so that a rear surface of the sliding member protrudes from the positioning recess, applying an adhesive to the rear surface of the sliding member, arranging the first pressing surface of the first jig so as to face the first sliding surface of the carriage, pressing the rear surface of the sliding member in the positioning recess against the first sliding surface by affixing the first jig to the carriage with a bolt, removing the first jig from the carriage by loosening the bolt after the adhesive has hardened, preparing a second jig having second pressing surfaces provided so as to be capable of facing the second sliding surfaces of the carriage and having positioning recesses formed for receiving and positioning the sliding members, preparing a third jig having third pressing surfaces provided so as to be capable of facing the third sliding surfaces of the carriage and having positioning recesses formed for receiving and positioning the sliding members, arranging the sliding members in the respective positioning recesses of the second and third jigs so that rear surfaces of the sliding members protrude from the positioning recesses, applying adhesive to the rear surfaces of the sliding members, arranging the second pressing surfaces of the second jig so as to face the second sliding surfaces of the carriage, arranging the third pressing surfaces of the third jig so as to face the third sliding surfaces of the carriage, pressing the respective rear surfaces of the sliding members in the positioning recesses against the second and third sliding surfaces of the carriage by affixing the second and third jigs with bolts, and loosening the bolts after the adhesive has hardened and removing the second and third jigs from the carriage.

Advantageous Effects of Invention

According to the present invention, since the sliding linear motion guide device is attached between the support body and the moving body, and lubricant can be supplied to and discharged from the first and second passages to the lubricant pockets of the sliding members adhered to the carriage, it is possible to improve the vibration damping property, quietness, load bearing capacity, straightness, and damping property of the sliding linear motion guide device while taking advantage of the compactness and ease of handling of conventional rolling linear motion guides.

DESCRIPTION OF EMBODIMENTS

The preferred embodiments of the present invention will be described below with reference to the attached drawings.

Figure 1:
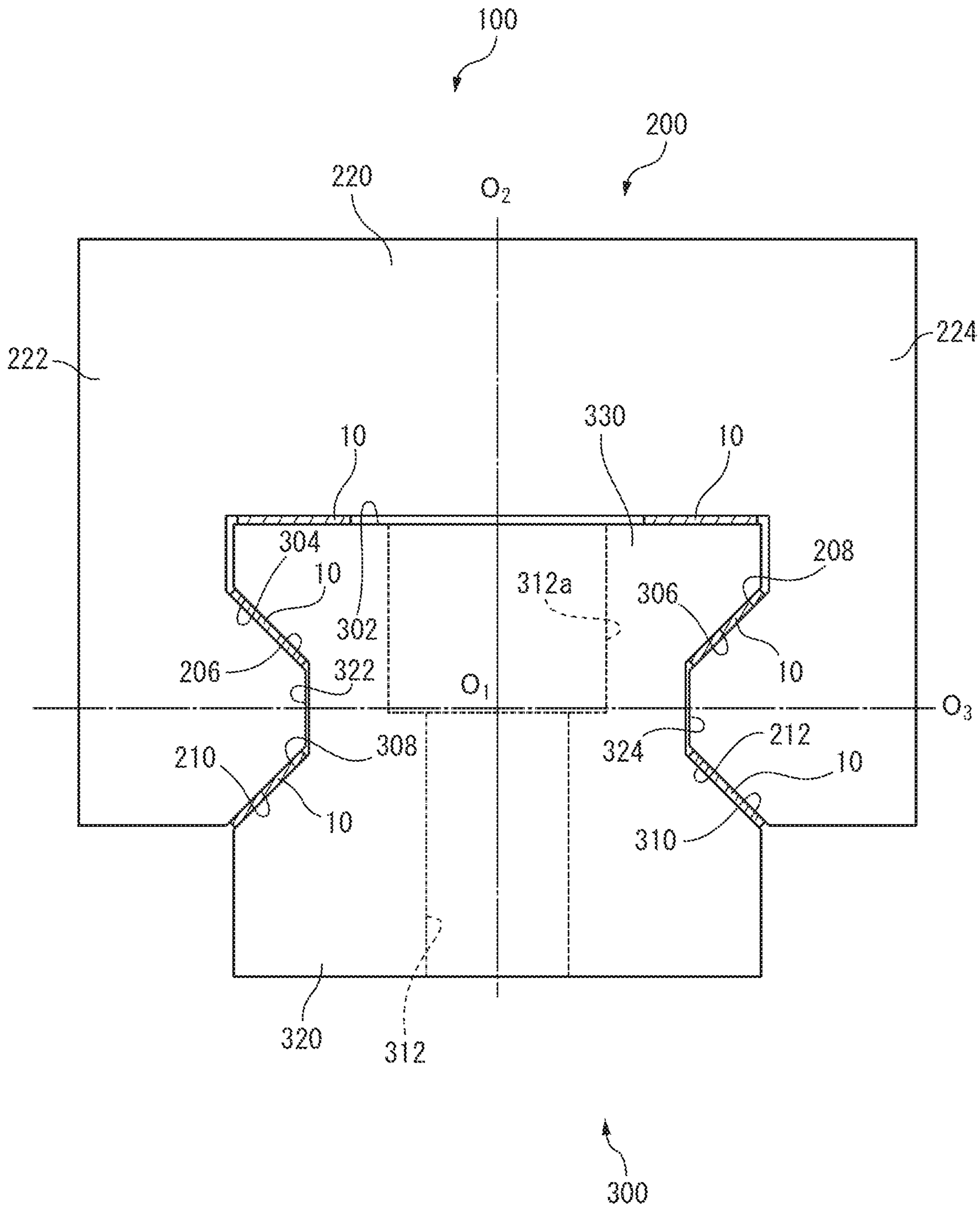
FIG. 1 is an end view of a sliding linear motion guide device according to a preferred embodiment of the present invention.
Figure 2:
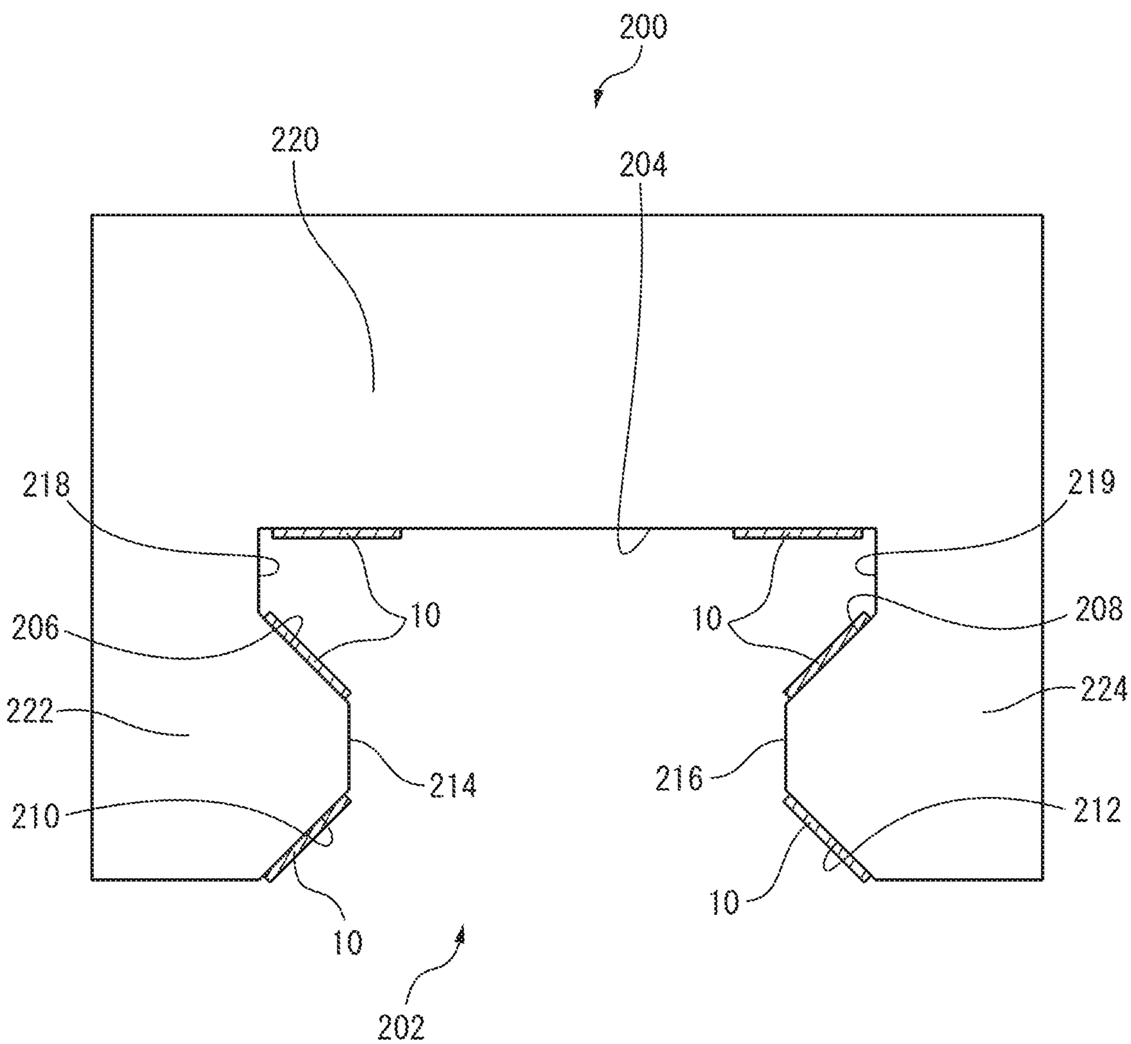
FIG. 2 is an end view of a carriage of the sliding linear motion guide device of FIG. 1.
Figure 3:
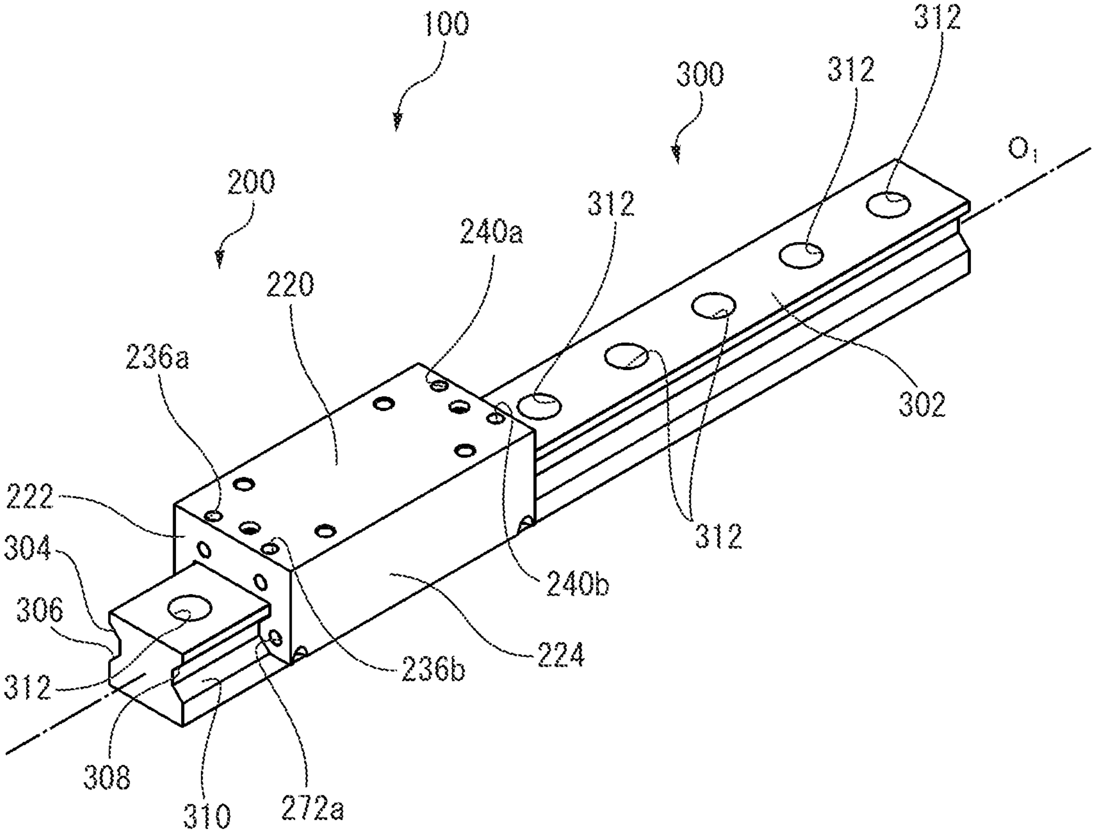
FIG. 3 is a perspective view of the sliding linear motion guide device of FIG. 1.

In FIGS. 1 to 3, the sliding linear motion guide device 100 according to a preferred embodiment of the present invention comprises a carriage 200 which is guided and reciprocates along a rail 300. The rail 300 is a linearly-extending rod-shaped member which comprises a base part 320 which is affixed to a support body such as a bed (not illustrated) or column (not illustrated) for supporting a moving body such as a table (not illustrated) or spindle head (not illustrated) of a machine tool so as to be capable of linearly reciprocating, and a guide part 330 integrally formed with the base part 320.

The guide part 330 has a first guiding surface or main guiding surface 302 formed on the opposite side of the support body when the rail 300 is attached to the support body. The main guiding surface 302 consists of a plane extending parallel to the support body to which the rail 300 is attached. Furthermore, as used herein, the movement direction of the moving body, i.e., the axis extending in the direction of extension of the rail 300, is referred to as the longitudinal central axis O1, the axis extending perpendicular to the main guiding surface 302 is referred to as the vertical axis O2, and the axis extending perpendicular to the central axis O1 and the vertical axis O2 is referred to as the transverse axis O3. As used herein, the direction of the central axis O1 is described as the longitudinal direction, the direction of the vertical axis O2 is described as the vertical direction, and the direction of the transverse axis O3 is described as the horizontal direction.

The main guiding surface 302 is preferably formed in a shape parallel to the plane formed by the central axis O1 and the transverse axis O3 and symmetrical with respect to the vertical axis O2. The guide part 330 also has a pair of guide recesses extending parallel to the central axis O1 on both sides except the main guiding surface 302. Each of the pair of guide recesses is formed with a second guiding surface or upper guiding surface 304, 306 adjacent to the main guiding surface 302 and a third guiding surface or lower guiding surface 308, 310 adjacent to the base part 320.

The upper guiding surfaces 304, 306 are inclined with respect to the vertical axis O2 or the transverse axis O3 so as to extend in the direction of the central axis O1 and form an acute angle with respect to the main guiding surface 302. The upper guiding surfaces 304, 306 are also preferably arranged symmetrically with respect to the vertical axis O2.

Likewise, the lower guiding surfaces 308, 310 extend in the direction of the central axis O1 and are inclined with respect to the vertical axis O2 or the transverse axis O3. The lower guiding surfaces 308, 310 are also preferably arranged symmetrically with respect to the vertical axis O2 and paired with each other. In this case, the vertical axis O2 is the axis of symmetry of the rail 300.

The upper guiding surfaces 304, 306 and the lower guiding surfaces 308, 310 are also preferably arranged vertically symmetrically with respect to the transverse axis O3 and paired with each other. The upper guiding surfaces 304, 306 and the lower guiding surfaces 308, 310 can be inclined at an angle of 45° with respect to the vertical axis O2 and the transverse axis O3.

In the present embodiment, transition surfaces 322, 324 are formed between the upper guiding surfaces 304, 306 and the lower guiding surfaces 308, 310. The transition surfaces 322, 324 can be parallel to the plane formed by the central axis O1 and the vertical axis O2. In this manner, the guide recess of the guide part 330 becomes a substantially V-shaped groove having two slopes formed by the upper guiding surfaces 304, 306 and the lower guiding surfaces 308, 310.

The transition surfaces 322, 324 need not necessarily be provided, and the upper guiding surfaces 304, 306 and the lower guiding surfaces 308, 310 may be connected to each other by a straight line parallel to the central axis O1. In this case, the guide recess of the guide part 330 becomes a V-shaped groove composed of two slopes formed by the upper guiding surfaces 304, 306 and the lower guiding surfaces 308, 310.

The transition surfaces 322, 324 may have an arc shape or other curved shape when viewed from the end of the rail 300. Also in this case, the guide recess of the guide part 330 is a substantially V-shaped groove having two slopes formed by the upper guiding surfaces 304, 306 and the lower guiding surfaces 308, 310.

The rail 300 is also formed with a plurality of affixation holes 312 penetrating the base part 320 and the guide part 330 through the vertical axis O2. The plurality of affixation holes 312 are preferably arranged at equal intervals in the longitudinal direction along the central axis O1. The rail 300 can be affixed to the support body by inserting an affixation bolt (not illustrated) into each of the affixation holes 312 and screwing it into a screw hole (not illustrated) formed in the support body. The affixation holes 312 have large diameter portions or counterbore portions 312*a* for accommodating the head of the affixation bolts so that the heads of the affixation bolt do not protrude from the main guiding surface 302 when the rail 300 is affixed to the support body.

The carriage 200 has a base part 220 affixed to the moving body such as the table or spindle head of a machine tool, and first and second arms 222, 224 which protrude toward the rail 300 from both edges extending in the direction of extension of the rail 300 in the base part 220, and is a member having a substantially U-shaped cross-section. A receiving recess 202 which receives the guide part 330 of the rail 300 is formed by the base part 220 and the first and second arms 222, 224.

The base part 220 is formed with a first sliding surface or a main sliding which faces the main guiding surface 302 of the rail 300 when the carriage 200 is assembled with the rail 300. The main sliding surface 204 is formed with at least two bolt holes 270 (refer to FIG. 8) in which internal threads are formed. The bolt holes 270 extend perpendicular to the main sliding surface 204.

Each of the first and second arms 222, 224 has a second sliding surface or upper sliding surface 206, 208 and a third sliding surface or lower sliding surface 210, 212 facing the upper guiding surfaces 304, 306 and lower guiding surfaces 308, 310, respectively, of the rail 300 when the carriage 200 is assembled with the rail 300.

The upper sliding surfaces 206, 208 and the lower sliding surfaces 210, 212 extend parallel to the respectively-facing upper guiding surfaces 304, 306 and lower guiding surfaces 308, 310 when the carriage 200 is assembled with the rail 300. Furthermore, transition surfaces 214, 216 are provided perpendicular to the main sliding surface 204 between the upper sliding surfaces 206, 208 and the lower sliding surfaces 210, 212.

Thin plate-shaped sliding members 10 are adhered to the main sliding surface 204, the upper sliding surfaces 206, 208, and the lower sliding surfaces 210, 212. The sliding members 10 can be composed of a material having high wear resistance and a low coefficient of friction, for example, a bearing material which is formed in a thin plate shape from a fluororesin and is commercially available under the trade names of Turcite and BEAREE. The sliding member 10 can be produced by leaving a land part and convex part on one surface of a thin plate-shaped bearing material cut to a predetermined size by a machining center using a rotary tool such as an end mill, and forming a lubricant pocket by scraping the surface of the bearing material. The cutting process of the sliding member 70 is performed by affixing the sliding member 70 to the table of the machining center using a vacuum chuck.

Figure 6:
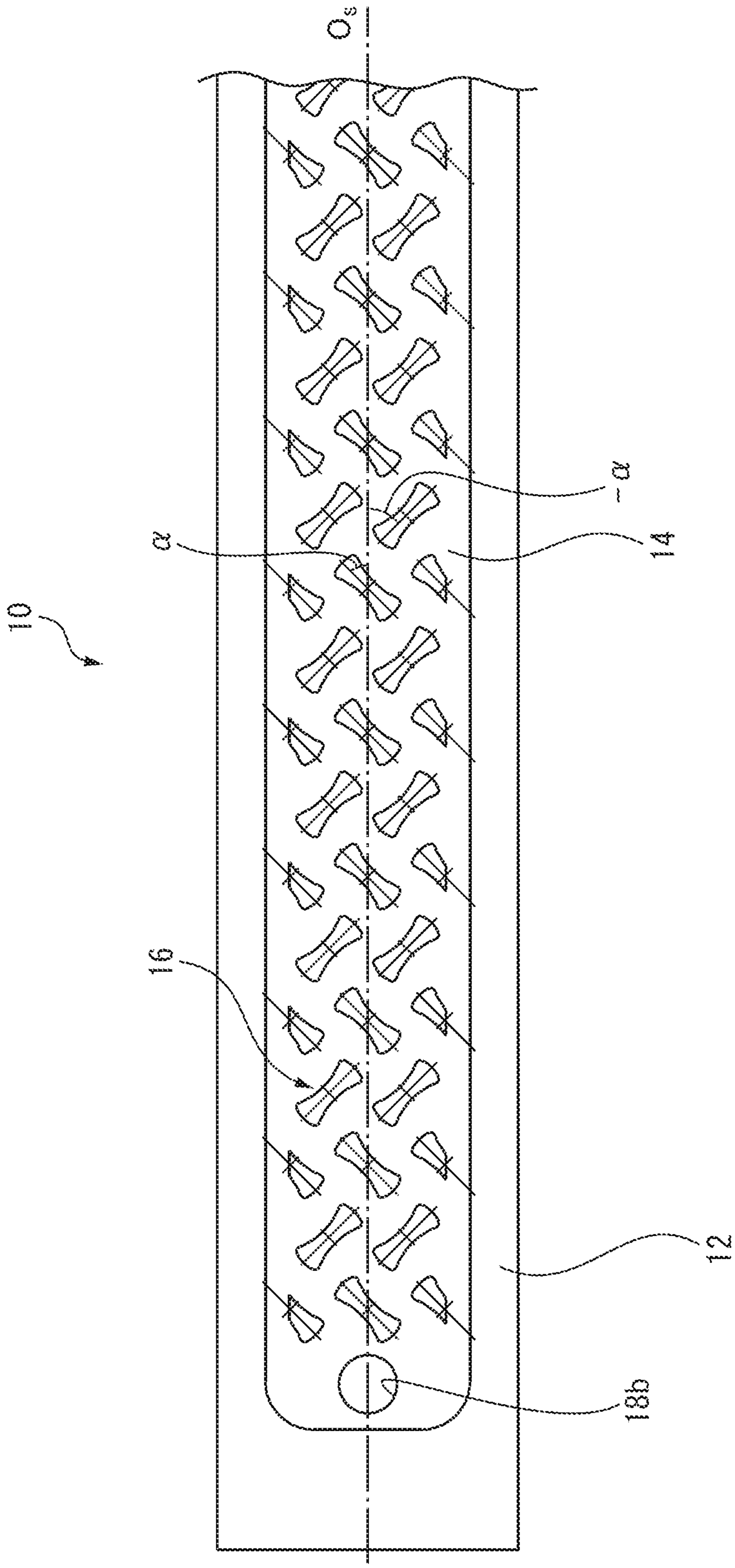
FIG. 6 is a partially-enlarged plan view showing a pan of the sliding member of FIG. 4 in an enlarged manner.

With reference to FIG. 6, a land part 12 extending in a rectangular shape and having a predetermined width, and a lubricant pocket 14 surrounded by the land part 12 are formed in the sliding member 10. A large number of convex parts 16 and first and second ports 18*a* and 18*b* are formed in the lubricant pocket 14. The number and dimensions of the convex parts 16 are determined so that the total area of the surfaces of the convex parts 16 in the lubricant pocket 14 is preferably 15 to 50% of the area inside the land part 12.

Figure 7:
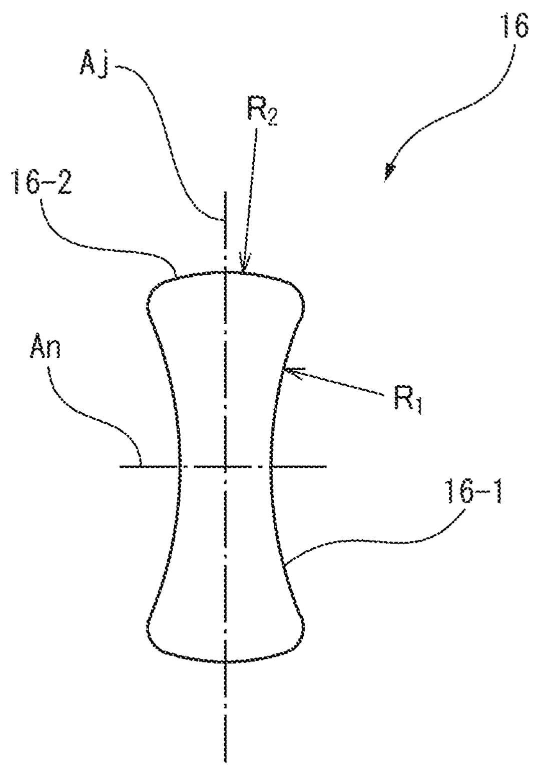
FIG. 7 is an enlarged view of a convex part of the sliding member of FIG. 4.

With reference to FIG. 7, each convex part 16 has an elongated shape having a major axis Aj and a minor axis An. In the convex parts 16, both ends along the major axis Aj are formed wider than the central portion thereof. Preferably, each convex part 16 has both ends that cross the minor axis An and are recessed in an arc shape. Further, both ends of each convex part 16 in the major axis Aj direction bulge in an arc shape.

Furthermore, the convex parts 16 are formed so that the major axis Aj is inclined at predetermined angles $\alpha$ and $-\alpha$ with respect to the central axis Os in the longitudinal direction of the sliding member 10. More specifically, the convex parts 16 are regularly machined so that the inclination angles $\alpha$ and $-\alpha$ of the major axis Aj with respect to the central axis Os alternate. The inclination angle of the major axis Aj with respect to the central axis Os in the longitudinal direction can be appropriately selected according to the application in consideration of the movement speed of the carriage 200 and the load applied to the carriage 200.

By arranging the convex parts 16 so that the inclination angles $\alpha$ and $-\alpha$ alternate with respect to the central axis Os along the length of the sliding member 10, while carriage 200, 200' (regarding 200', refer to FIG. 9) reciprocates, the lubricant in the lubricant pocket 14 flows in the direction opposite to the movement direction of the carriage 200 and 200', and also flows toward the side of the sliding member 10 when it hits the convex part 16.

First and second ports 18*a*, 1816 are arranged at opposite ends of the sliding member 10 so as to be separated from each other in the direction of the central axis Os, and are formed so as to open into the lubricant pocket 14. Furthermore, the land part 12 surrounding the lubricant pocket 14 is formed at substantially the same height as the convex parts 16 in the lubricant pocket 14, and the surfaces of land part 12 and convex pans 16 slide on the main guiding surface 302, the upper guiding surfaces 304, 306, and lower guiding surfaces 308, 310 while in direct contact with the main guiding surface 302, the upper guiding surfaces 304, 306, and the lower guiding surfaces 308, 310 of the rail 300.

Though the main sliding surface 204, the upper sliding surfaces 206, 208, and the lower sliding surfaces 210, 212 have sliding members 10 of the same shape and dimensions attached thereto in the illustrated embodiment, depending on the application, sliding members 10 having different shapes and dimensions or sliding members 10 having convex parts 16 which have different shapes and/or arrangements can be attached.

Figure 8:
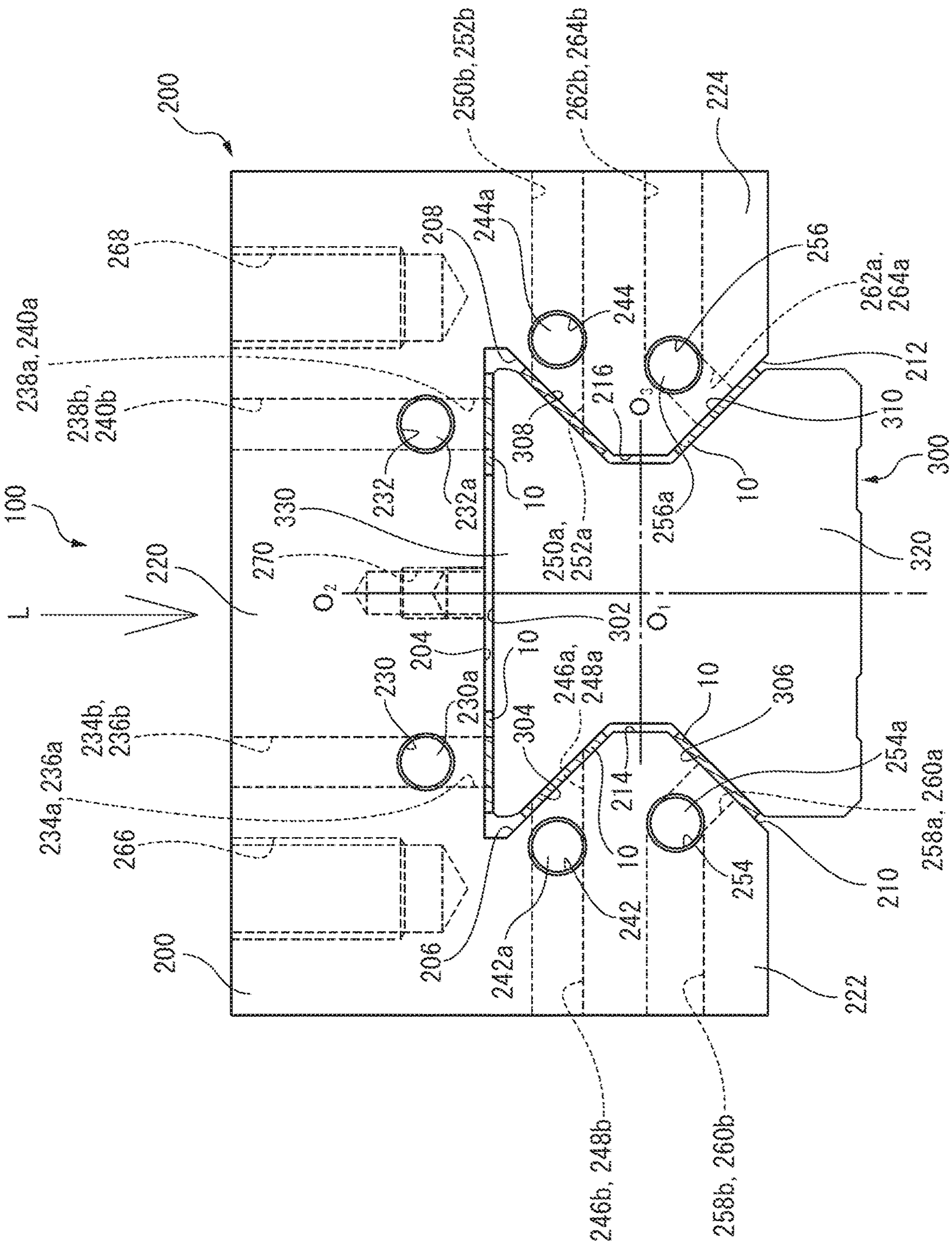
FIG. 8 is an end view showing arrangement during use of the sliding linear motion guide device along with passages in the carriage.

Referring to FIG. 8, lubricant return passages 230, 232, 242, 244, 254, 256 which communicate with the first and second ports 18*a*, 18*b* of each sliding member 10, lubricant supply passages 234*a*, 234*b*; 238*a*. 238*b*; 246*a*, 246*b*; 250*a*, 250*b*; 258*a*, 258*b*; 262*a*, 262*b* which communicate with the lubricant return passages 230, 232, 242, 244, 254, 256 for supplying lubricant from a lubricant supply device (not illustrated) to the lubricant pockets 14, and lubricant discharge passages 236*a*, 236*b*; 240*a*, 240*b*; 248*a*, 248*b*; 252*a*, 252*b*; 260*a*, 260*b*; 264*a*, 264*b* which communicate with the lubricant return passages 230, 232, 242, 244, 254, 256 and which discharge lubricant in the lubricant pockets 14 through the lubricant return passages 230, 232, 242, 244, 254, 256 are formed in the carriage 200. The lubricant discharge passages 236*a*, 236*b*; 240*a*, 240*b*; 248*a*, 248*b*; 252*a*, 252*b*; 260*a*, 260*b*: 264*a*, 264*b* are connected to the lubricant supply device.

The embodiment of FIG. 8 is particularly suitable when the vertical axis O2 is arranged in the vertical direction and the sliding linear motion guide device 100 is used. At this time, typically, the central axis O1 and the transverse axis O3 are arranged horizontally. i.e., the main guiding surface 302 of the rail 300 is arranged horizontally. In this case, as shown in FIG. 8, the load L acts on the carriage 200 in parallel with the vertical axis O2 or perpendicular to the main guiding surface 302. The carriage 200 of FIG. 8 is not limited to such an arrangement of the sliding linear motion guide device 100, and if the load L acting on the carriage 200 is parallel to the vertical axis O2 or perpendicular to the main guiding surface 302, it can also be used when the sliding linear motion guide device 100 is arranged so that, for example, the central axis O1 is in an oblique direction inclined from the horizontal direction or the central axis O1 is in the vertical direction.

In the embodiment of FIG. 8, in the lubricant return passages which are symmetrically arranged with respect to the vertical axis O2 and paired with each other, and specifically the lubricant return passages 230, 232, the lubricant return passages 242, 244, and the lubricant return passages 254, 256, it is preferable to configure the lubricant supply circuit so that each pair of lubricant return passages have substantially the same pressure as each other.

Figure 9:
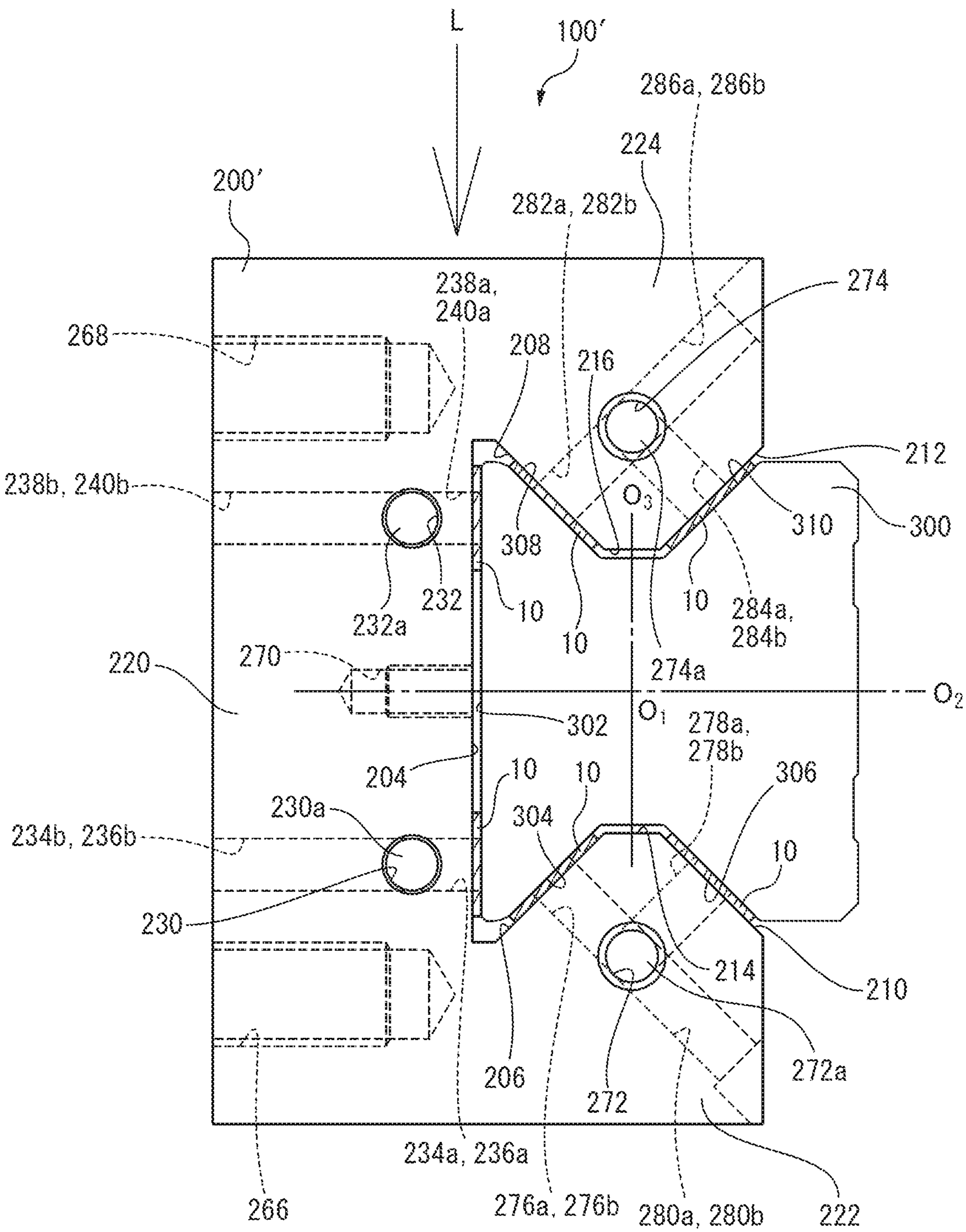
FIG. 9 is an end view showing arrangement during use of the sliding linear motion guide device along with passages in the carriage.

Furthermore, the arrangement of the sliding linear motion guide device of the present invention is not limited to the above-mentioned arrangement. As shown in FIG. 9, the sliding linear motion guide device of the present invention can also be arranged so that the load L acts on the carriage 200' in a direction parallel to the transverse axis O3 or the main guiding surface 302.

In FIG. 9, the sliding linear motion guide device 100' is typically arranged so that the transverse axis O3 is vertical and the central axis O1 and vertical axis O2 are horizontal. The sliding linear motion guide device 100' may be arranged so that the central axis O1 is in a diagonal direction inclined from the horizontal direction as long as the load L acts on the carriage 200' in a direction parallel to the transverse axis O3 or the main guiding surface 302. Note that in FIG. 9, in order to distinguish the embodiments of FIGS. 8 and 9, components which are identical to those of the sliding linear motion guide device 100 of FIG. 8 have been assigned the same reference numbers, except that the reference codes for the sliding linear motion guide device and carriage are marked with the ['] symbol.

Referring to FIG. 9, lubricant return passages 230, 232, 272, 274 which communicate with the first and second ports 18*a*, 18*b* of each sliding member 10, lubricant supply passages 234*a*, 234*b*; 238*a*, 238*b*; 276*a*, 278*a*, 280*a*; 282*a*, 284*a*, 286*a* which communicate with the lubricant return passages 230, 232, 272, 274 for supplying lubricant from a lubricant supply device (not illustrated) to the lubricant pockets 14, and lubricant discharge passages 236*a*, 236*b*; 240*a*, 240*b*; 276*b*, 278*b*, 280*b*; 282*b*, 284*b*, 286*b* which communicate with the lubricant return passages 230, 232, 272, 274 and which discharge lubricant in the lubricant pockets 14 through the lubricant return passages 230, 232, 272, 274 are formed in the carriage 200'. The lubricant discharge passages 236*a*, 236*b*; 240*a*, 240*b*; 276*b*, 278*b*, 280*b*; 282*b*, 284*b*, 286*b* are connected to the lubricant supply device.

In the embodiment of FIG. 9, in the lubricant return passages which are symmetrically arranged with respect to the vertical axis O2 and paired with each other, and specifically the lubricant return passages 230, 232, the lubricant return passages 242, 244, and the lubricant return passages 254, 256, it is preferable to configure the lubricant supply circuit so that each pair of lubricant return passages have substantially the same pressure as each other.

A shown in FIGS. 8 and 9, an embodiment in which the carriage 200, 200' is provided with lubricant return passages 230, 232, 242, 244, 254, 256 is suitable for use in the linear guide system shown in FIGS. 21 and 22, which are described later. Conversely, when used in the linear guide system shown in FIGS. 23 and 24, which are described later, the carriage 200 does not comprise lubricant return passages 230, 232, 242, 244, 254, 256.

Next, referring to FIGS. 10 to 20, the method for the production of the carriage 200, 200' will be described. First, referring to FIGS. 10 to 15, the cutting method of the carriage 200, 200' will be described.

The carriage 200, 200' can be produced, for example, by a machining center having linear feed shafts having three orthogonal axes and at least one rotary feed axis. In the following description, the case in which the carriage 200 prior to adhering the sliding members 10 thereto is cut by a horizontal machining center having X-axis, Y-axis, and Z-axis linear feed shafts and an A-axis rotary feed shaft will be described. The carriage 200' can be machined in the same manner as the carriage 200.

The workpiece (carriage 200, 200') is affixed to a table 400 which can be rotationally fed in the A-axis direction. The workpiece can be affixed directly to the table 400 or affixed to the table 400 via a jig such as an angle plate or a pallet. For the workpiece, first, a rotary tool (not illustrated) such as an end mill or a T-shaped cutter is attached to a spindle (not illustrated) via a tool holder 404, the table 400 and the rotary tool 402 are moved relative to each other in the longitudinal direction of the workpiece, which is the X-axis direction in the illustrated embodiment, and a groove having a T-shaped cross section and having a width equal to the dimension between the relief surfaces 218, 219 and the dimension between the transition surfaces 214, 216 is machined.

Figure 10:
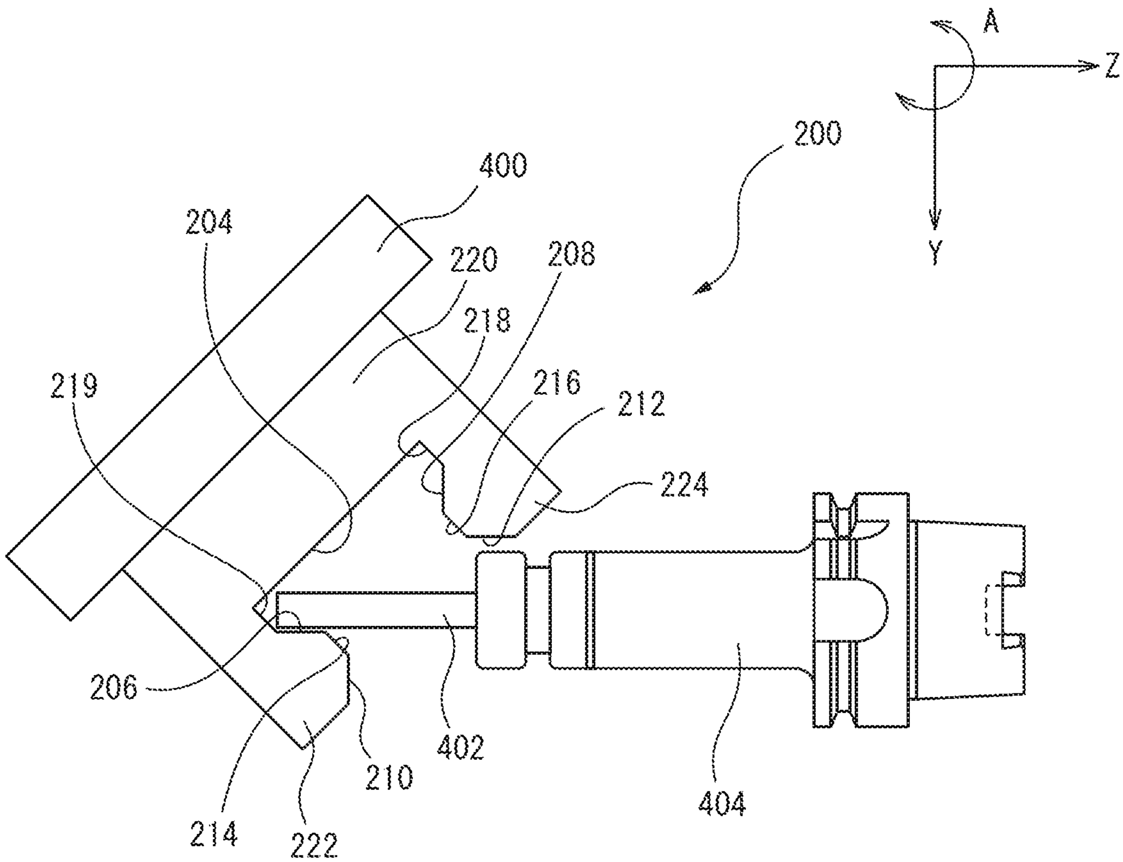
FIG. 10 is a view detailing the production method of the carriage.

Next, the table 400 is positioned at an angle in the A-axis direction corresponding to the angle of the upper guiding surface 304 and the lower guiding surface 310 described above, in the present embodiment, at a rotation position of −45°, and the rotary tool 402 is fed relative to the table 400 in the X-axis direction to machine the upper sliding surface 206 and the lower sliding surface 212 with the side surface of the rotary tool 402 (FIG. 10).

Figure 11:
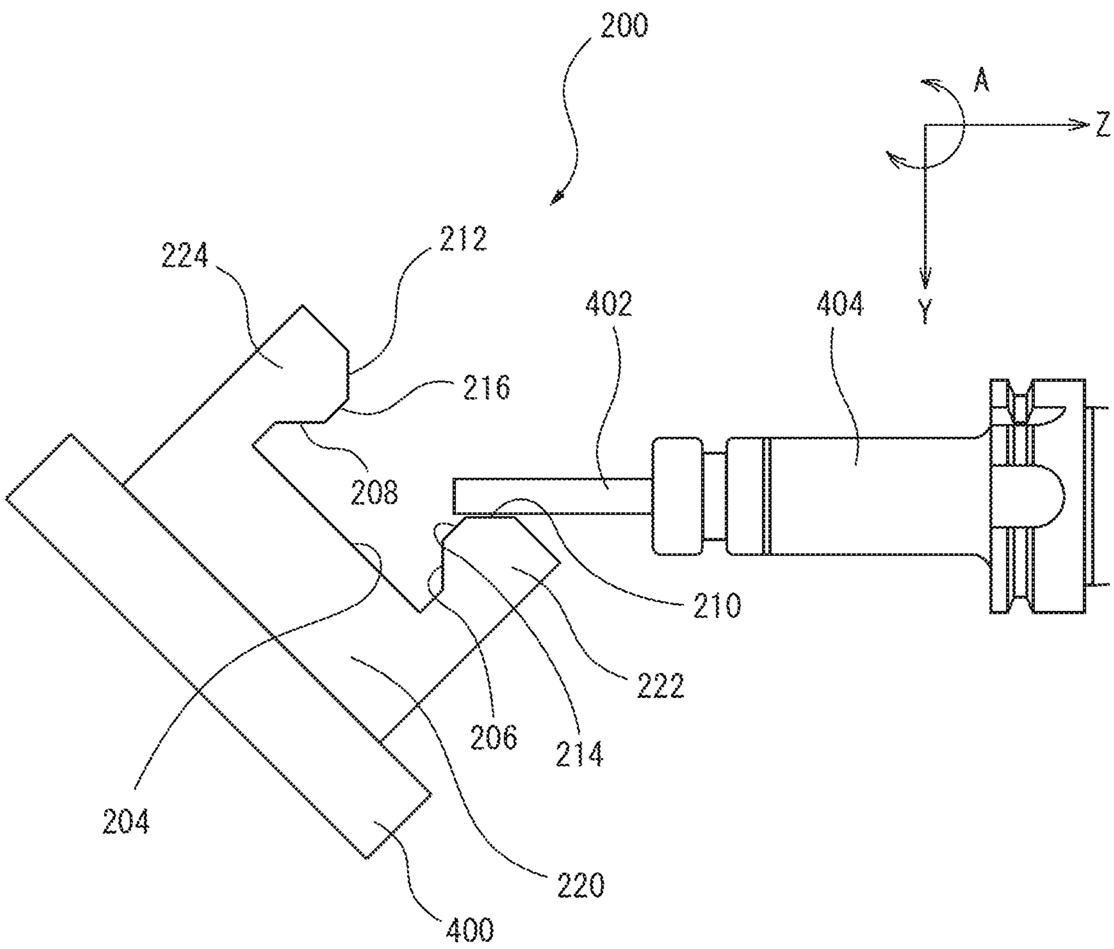
FIG. 11 is a view detailing the production method of the carriage.

Next, the table 400 is positioned in the A-axis direction at an angle corresponding to the above-mentioned angles of the upper guiding surface 306 and the lower guiding surface 308, i.e., at a rotation position of 45° in the present embodiment, and the rotary tool 402 is fed relative to the table 400 in the X-axis direction to machine the upper sliding surface 208 and the lower sliding surface 210 on the side surface of the rotary tool 402 (FIG. 11).

Next, the lubricant return passages 230, 232, 242, 244, 254, 256 are cut from one end surface of the carriage 200 in the longitudinal direction. The openings of the lubricant return passages 230, 232, 242, 244, 254, 256 are closed on the end surface by plugs 230*a*, 232*a*, 242*a*, 244*a*, 254*a*, 256*a*.

Further, the lubricant supply passages 234*a*, 234*b*; 238*a*, 238*b*; 246*a*, 246*b*; 250*a*, 250*b*; 258*a*, 258*b*; 262*a*, 262*b* and the lubricant discharge passages 236*a*, 236*b*; 240*a*, 240*b*; 248*a*, 248*b*; 252*a*, 252*b*; 260*a*, 260*b*; 264*a*, 264*b* are cut from the side surface of the carriage 200 toward the lubricant return passages 230, 232, 242, 244, 254, 256, the main sliding surface 204, the upper sliding surfaces 206, 208, and the lower sliding surfaces 210, 212.

Likewise in the case of the carriage 200', the lubricant return passages 230, 232, 242, 244, 254, 256 are cut from one end surface of the carriage 200' in the longitudinal direction, the openings of the lubricant return passages 230, 232, 242, 244, 254, 256 are closed by plugs 230*a*, 232*a*, 242*a*, 244*a*, 254*a*, 256*a*, and the lubricant supply passages 234*a*, 234*b*; 238*a*, 238*b*; 276*a*, 278*a*, 280*a*; 282*a*, 284*a*, 286*a* and the lubricant discharge passages 236*a*, 236*b*; 240*a*, 240*b*; 276*b*, 278*b*, 280*b*; 282*b*, 284*b*, 286*b* are cut.

Next, the method for adhering the sliding members 10 to the carriage 200, 200' will be described with reference to FIGS. 16 to 20.

Figure 16:
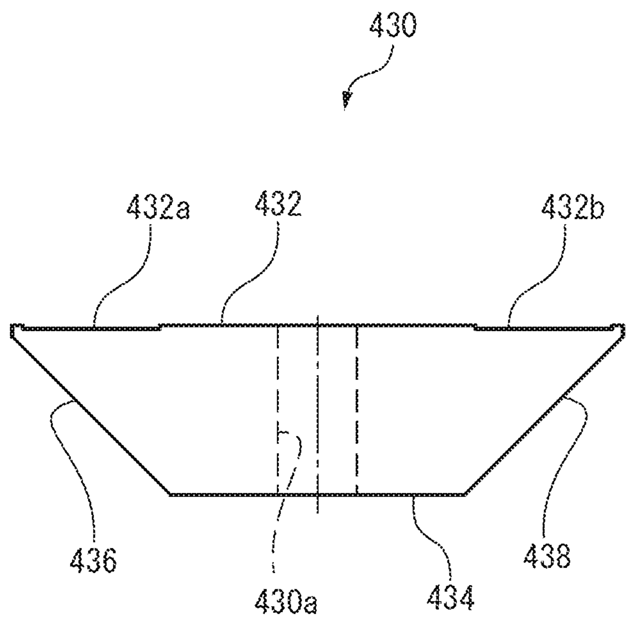
FIG. 16 is an end view of a first jig for adhering a sliding member to a first sliding surface of the carriage.

The sliding members 10 can be adhered to the main sliding surface 204 of the carriage 200, 200' using a first jig 430, as shown in FIG. 16. The first jig 430 is smaller than the trapezoidal shape surrounded by the main sliding surface 204 and the upper sliding surfaces 206, 208 in an end view of the carriage 200, 200', and has a cross-section having a substantially similar shape as the trapezoidal shape. More specifically, there are provided an upper surface 432 forming a first pressing surface facing the main sliding surface 204 of carriage 200, 200' during use, a rear surface 434 on the side opposite the upper surface 432, and two inclined surfaces 436, 438 facing the upper sliding surfaces 206, 208. In the first jig 430, a through hole 430*a* is further formed from the rear surface 434 to the upper surface 432.

A pair of left and right positioning recesses 432*a*, 432*b* for receiving the sliding members 10 are formed on the upper surface 432. The positioning recesses 432*a*, 432*b* are formed with dimensions such that the sliding members 10 arranged in the positioning recesses 432*a*, 432*b* are firmly held without causing positional shifts. Furthermore, the positioning recess 432*a*, 432*b* have a depth such that the sliding members 10 vertically protrude from the upper surface 432 with a predetermined dimension when the sliding members 10 are arranged in the positioning recesses 432*a*, 432*b*.

Figure 17:
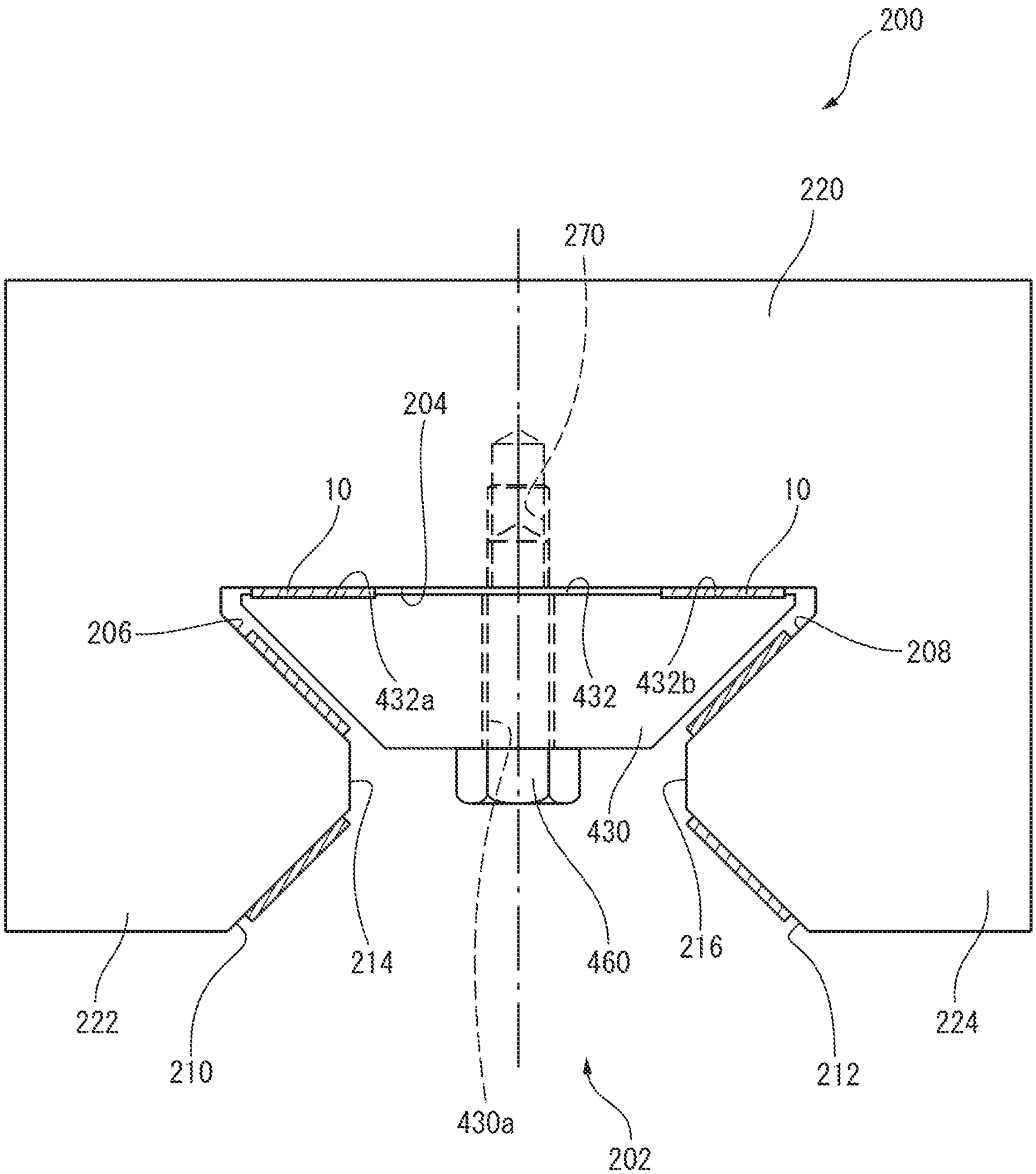
FIG. 17 is a view for detailing the method for adhering the sliding member to the first sliding surface of the carriage.

As shown in FIG. 17, when attaching the sliding members 10 to the main sliding surface 204 of the carriage 200, 200', the lubricant pockets 14 of the sliding members 10 are made to face the bottom surface of the positioning recesses 432*a*, 432*b*, and the sliding members 10 are arranged in the positioning recess 432*a*, 432*b*. At this time, the rear surfaces of the sliding members 10 on the opposite side of the lubricant pockets 14 are exposed from the positioning recesses 432*a*, 432*b*. Adhesive is applied to these rear surfaces.

By inserting the affixation bolts 460 into the through holes 430*a* and screwing them into the internal threading of the bolt holes 270, the upper surface 432 of the first jig 430 is positioned and pressed against the main sliding surface 204 of the carriage 200, 200'. In order to prevent the sliding members 10 in the positioning recesses 432*a* and 432*b* from being displaced due to the first jig 430 coming into contact with the main sliding surface 204 or the like while the affixation bolts 460 are being screwed, additional jigs (not illustrated) for positioning the first jig 430 with respect to carriage 200, 200' may be used. After the predetermined time required for the adhesive to cure has elapsed, the first jig 430 is removed.

Figure 18:
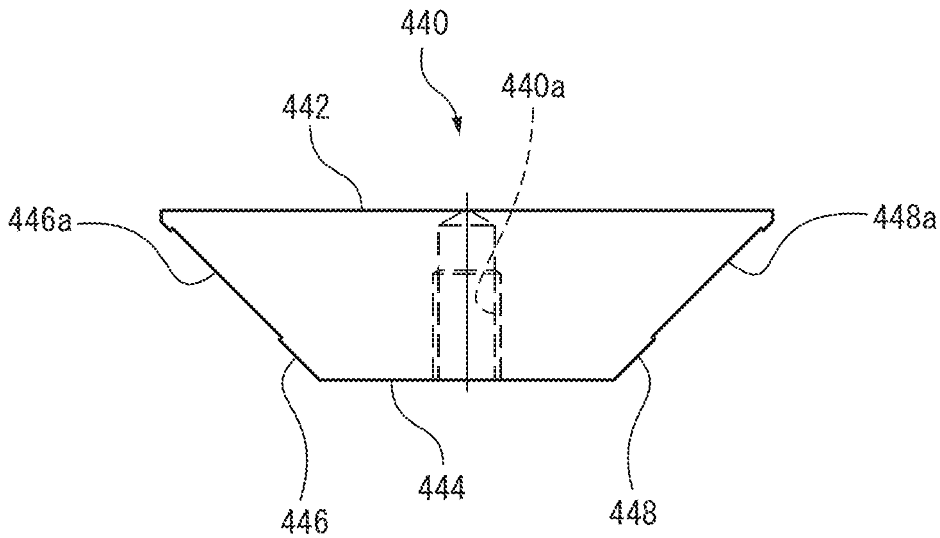
FIG. 18 is an end view of a second jig for adhering a sliding member to a second sliding surface of the carriage.
Figure 19:
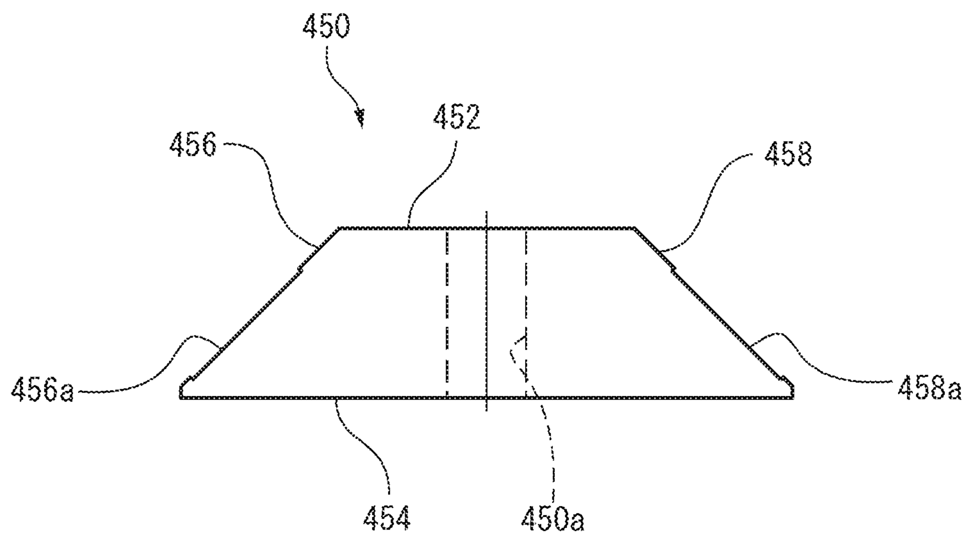
FIG. 19 is an end view of a third jig for adhering a sliding member to a third sliding surface of the carriage.

The sliding members 10 can also be attached to the upper sliding surfaces 206, 208 and the lower sliding surfaces 210, 212 of the carriage 200, 200' using second and third jigs 440, 450 as shown in FIGS. 18 and 19. In FIG. 18, the second jig 440 has substantially the same shape as the first jig 430, and has an upper surface 442 facing the main sliding surface 204 of the carriage 200, 200' during use, a lower surface 444 on the side opposite the upper surface 442, and two inclined surfaces 446, 448 facing the upper sliding surfaces 206, 208 and each forming a second pressing surface. The second jig 440 is further formed with bolt holes 440*a* in which internal threading is formed vertically from the lower surface 444.

Positioning recesses 446*a*, 448*a* for receiving the sliding members 10 are formed on the inclined surfaces 446, 448. The positioning recesses 446*a*, 448*a* are formed with dimensions such that the sliding members 10 arranged in the positioning recesses 446*a*, 448*a* are firmly held without causing misalignment. Furthermore, the positioning recesses 446*a*, 448*a* have a depth such that the sliding members 10 vertically protrude from the inclined surfaces 446, 448 with a predetermined dimension when the sliding members 10 are arranged in the positioning recesses 446*a*, 448*a*.

Referring to FIG. 19, the third jig 450 has substantially the same shape as the second jig 440 except that the top and bottom are exchanged, and has an upper surface 452 facing the lower surface 444 of the second jig 440, a lower surface 454 opposite the upper surface 452, and two inclined surfaces 456, 458 facing the lower sliding surfaces 210, 212 which each form a third pressing surface during use. Through holes 450*a* extending vertically from the lower surface 454 to the upper surface 452 are further formed in the third jig 450.

Positioning recesses 456*a*. 458*a* for receiving the sliding members 10 are formed on the inclined surfaces 456, 458. The positioning recess 456*a*, 458*a* are formed with a size such that the sliding members 10 arranged in the positioning recesses 456*a*, 458*a* are firmly held without causing misalignment. Furthermore, the positioning recesses 456*a*, 458*a* have a depth such that the sliding members 10 vertically protrude from the inclined surfaces 456, 458 with a predetermined dimension when the sliding members 10 are arranged in the positioning recesses 456*a*, 458*a*.

Figure 20:
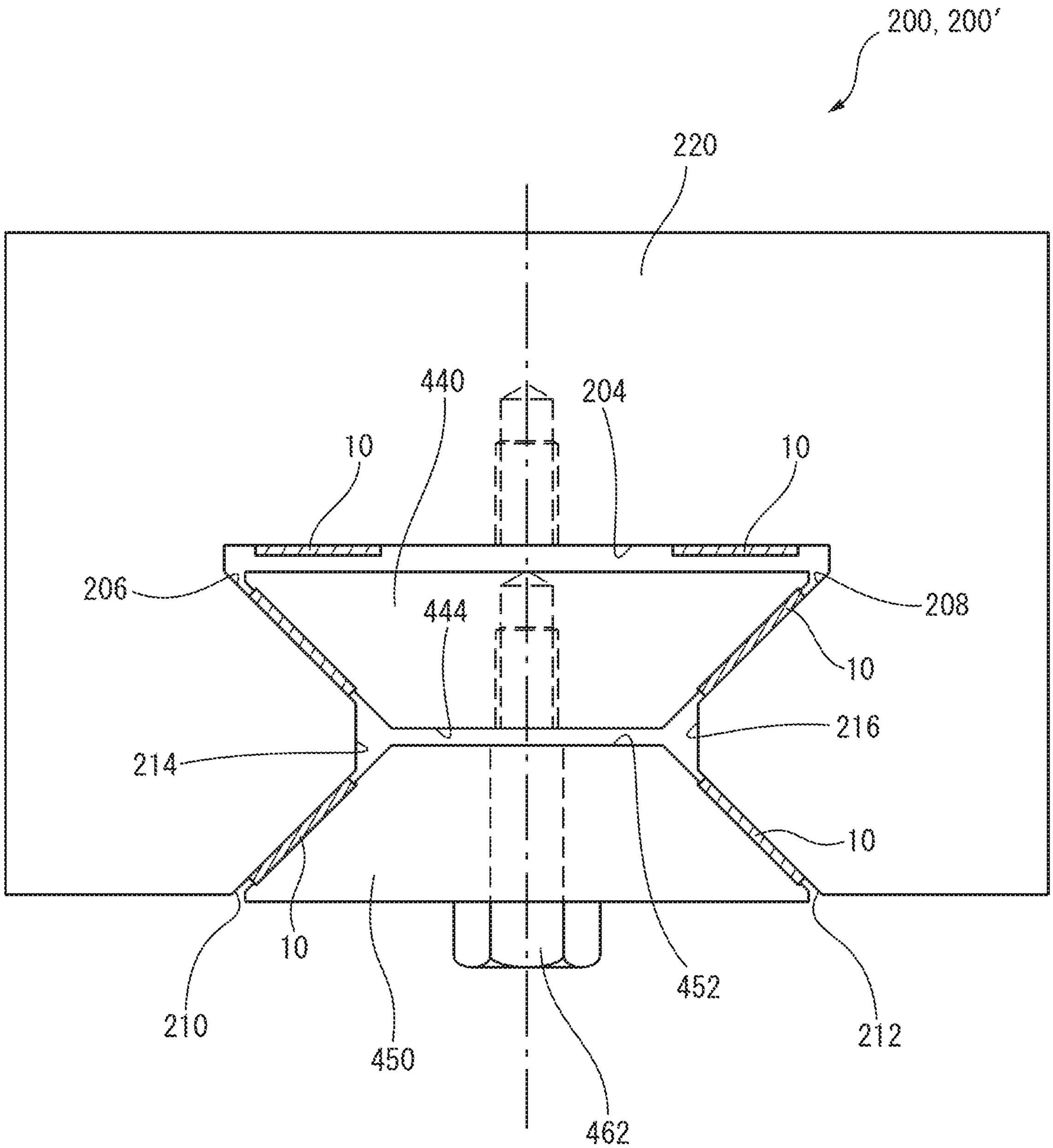
FIG. 20 is a view for detailing the method for adhering the sliding members to the second and third sliding surfaces of the carriage.

Referring to FIG. 20, when attaching the sliding members 10 to the upper sliding surfaces 206, 208 and lower sliding surfaces 210, 212 of the carriage 200, 200', the lubricant pockets 14 of the sliding members 10 are made to face the bottom surfaces of the positioning recesses 446*a*, 448*a*; 456*a*, 458*a* of the second and third jigs 440, 450, and the sliding members 10 are arranged in the positioning recesses 446*a*, 448*a*; 456*a*, 458*a*. At this time, the rear surfaces of the sliding members 10 on the side opposite the lubricant pockets 14 are exposed from the positioning recesses 446*a*, 448*a*; 456*a*, 458*a*. Adhesive is applied to these rear surfaces.

By inserting the affixation bolts 462 through the through holes 450*a* and screwing them into the internal threading of the bolt holes 440*a*, the second and third jigs 440, 450 are brought close to each other and the inclined surfaces 446, 448; 456, 458 are positioned and pressed against the upper sliding surfaces 206, 208; 210, 212 of the carriage 200, 200'. In order to prevent the sliding member 10 in the positioning recess 446*a*, 448*a*: 456*a*, 458*a* from being displaced due to the second and third jigs 440, 440 coming into contact with the upper sliding surfaces 206, 208; 210, 212 or the like while the affixation bolt 462 are being screwed, additional jigs (not illustrated) for positioning the second and third jigs 440, 445 with respect to carriage 200, 200' may be used.

In order to press the sliding members 10 against the upper sliding surfaces 206, 208 and the lower sliding surfaces 210, 212 with a constant pressure, it is preferable that the affixation bolts 462 be screwed into the internal threading of the bolt holes 440*a* with a predetermined tightening torque. After screwing the affixation bolts 462, the second and third jigs 440, 450 are held affixed to the carriage 200, 200' until the predetermined time required for the adhesive to cure has elapsed. Depending on the adhesive applied to the rear surfaces of sliding members 10, after screwing the affixation bolts 462, the second and third jigs 440, 450 and carriage 200, 200' may be placed in a heater such as an incubator and maintained at a predetermined high temperature for a predetermined time.

Figure 12:
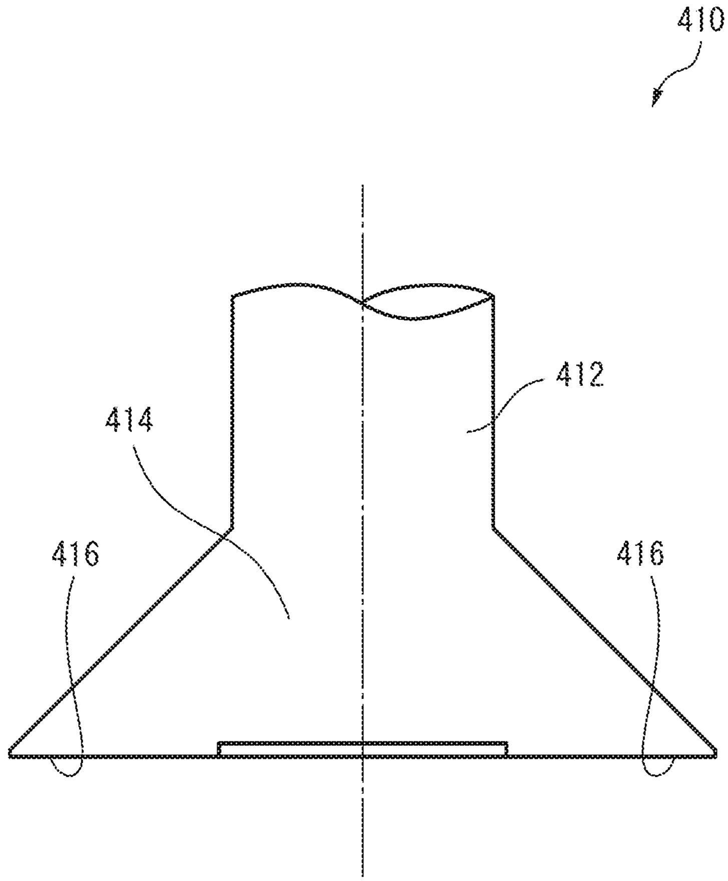
FIG. 12 is a schematic side view of a rotary tool for performing finishing machining of the carriage.
Figure 13:
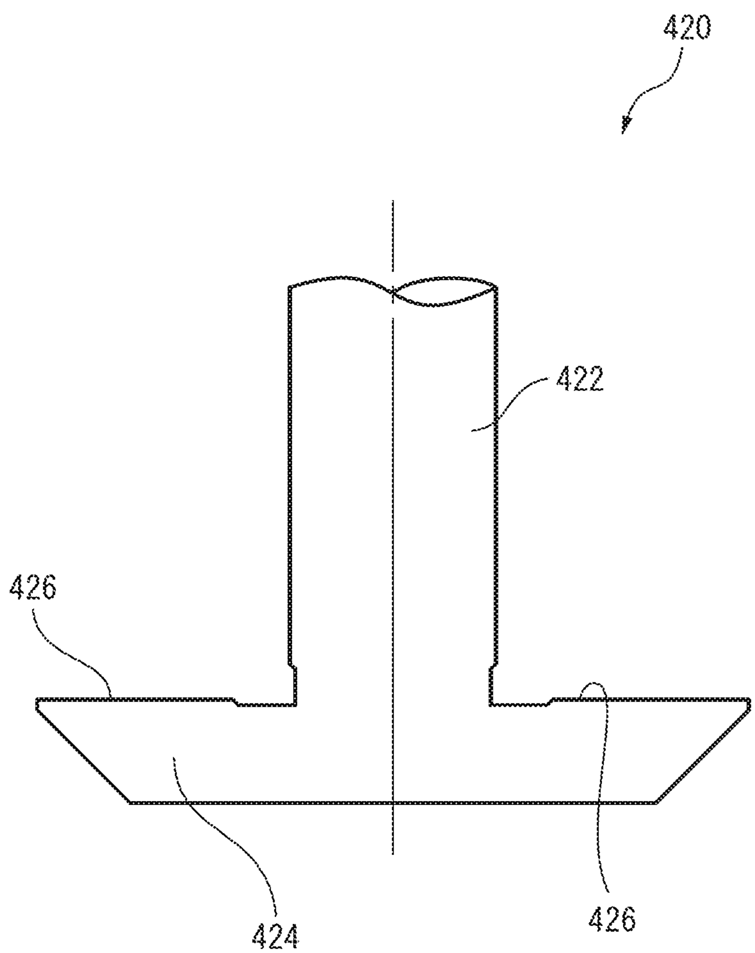
FIG. 13 is a schematic side view of another rotary tool for performing finishing machining of the carriage.

Next, the surfaces of the sliding members 10 adhered to the surfaces of the main sliding surface 204, upper sliding surfaces 206, 208 and lower sliding surfaces 210, 212 are finished with a rotary tool as shown in FIGS. 12 and 13. FIG. 12 shows an example of a rotary tool for finishing the sliding members 10 adhered to the main sliding surface 204 and the lower sliding surfaces 210, 212, and FIG. 13 shows a rotary tool for finishing the sliding members 10 adhered to the upper sliding surfaces 206, 208.

In FIG. 12, the rotary tool 410 is a front milling cutter and has a shank portion 412 mounted on a tool holder 404 and a truncated cone-shaped cutter body 414 coupled to the shank portion 412. A plurality of bottom blades 416 are arranged on the cutter body 414 at equal intervals in the circumferential direction. Furthermore, in the truncated cone-shaped cutter body 414, during the finishing process of the sliding members 10 adhered to the main sliding surface 204, the angle of the generatrix of the conical surface with respect to the bottom surface on which the bottom blades 416 are arranged is angled such that the surface (conical surface) of the cutter body 414 does not interfere with the sliding members 10 of the upper sliding surfaces 206, 208.

In FIG. 13, the rotary tool 420 has a shank portion 422 mounted on the tool holder 404 and an inverted truncated cone-shaped cutter body 424 coupled to the shank portion 422. A plurality of upper blades 426 are arranged on the cutter body 424 at equal intervals in the circumferential direction. Furthermore, in the truncated cone-shaped cutter body 424, during the finishing process of the sliding members 10 adhered to the upper sliding surfaces 206, 208, the angle of the generatrix of the conical surface with respect to the bottom surface on the opposite side of the upper blade 426 is angled such that the surface (conical surface and bottom surface) of the cutter body 424 does not interfere with the sliding members 10 of the main sliding surface 204.

Figure 14:
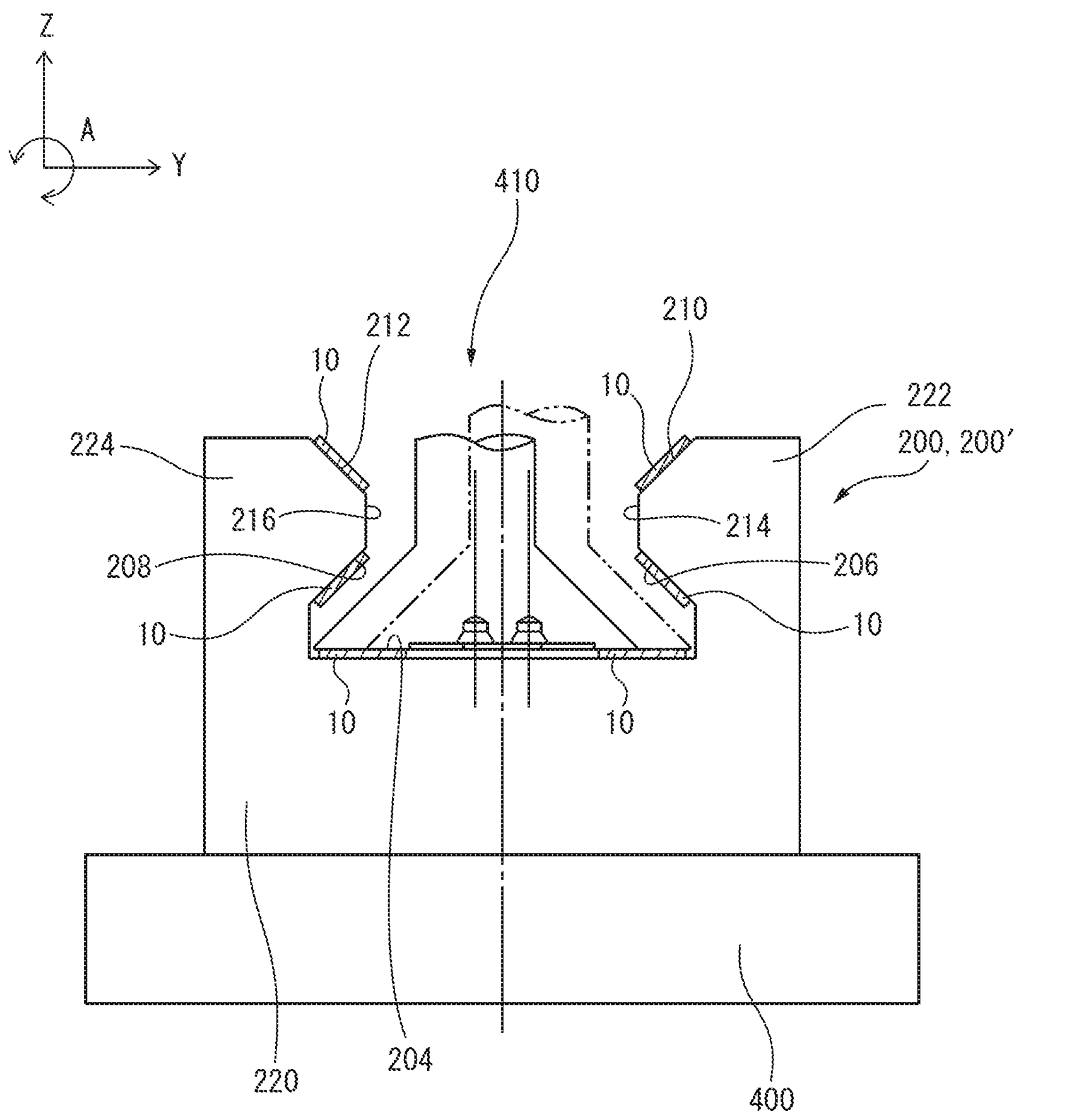
FIG. 14 is a view for detailing the finishing machining of the carriage.

As described above, the rotary tool 410 is mounted on a spindle, the table 400 is positioned at an angle position of 0° in the A-axis direction, the rotary tool 410 is fed relative to the table 400 in the X-axis direction, and the sliding members 10 of the main sliding surface 204 are finished by the bottom blades 416 of the rotary tool 410 (FIG. 14). When the diameter of the bottom blades 416 of the rotary tool 410 is smaller than the width of the main sliding surface 204, as in the present embodiment, the rotary tool 410 is fed relative to the table 400 in the X-axis direction at a plurality of positions in the Y-axis direction, and in FIG. 14, two positions.

Figure 15:
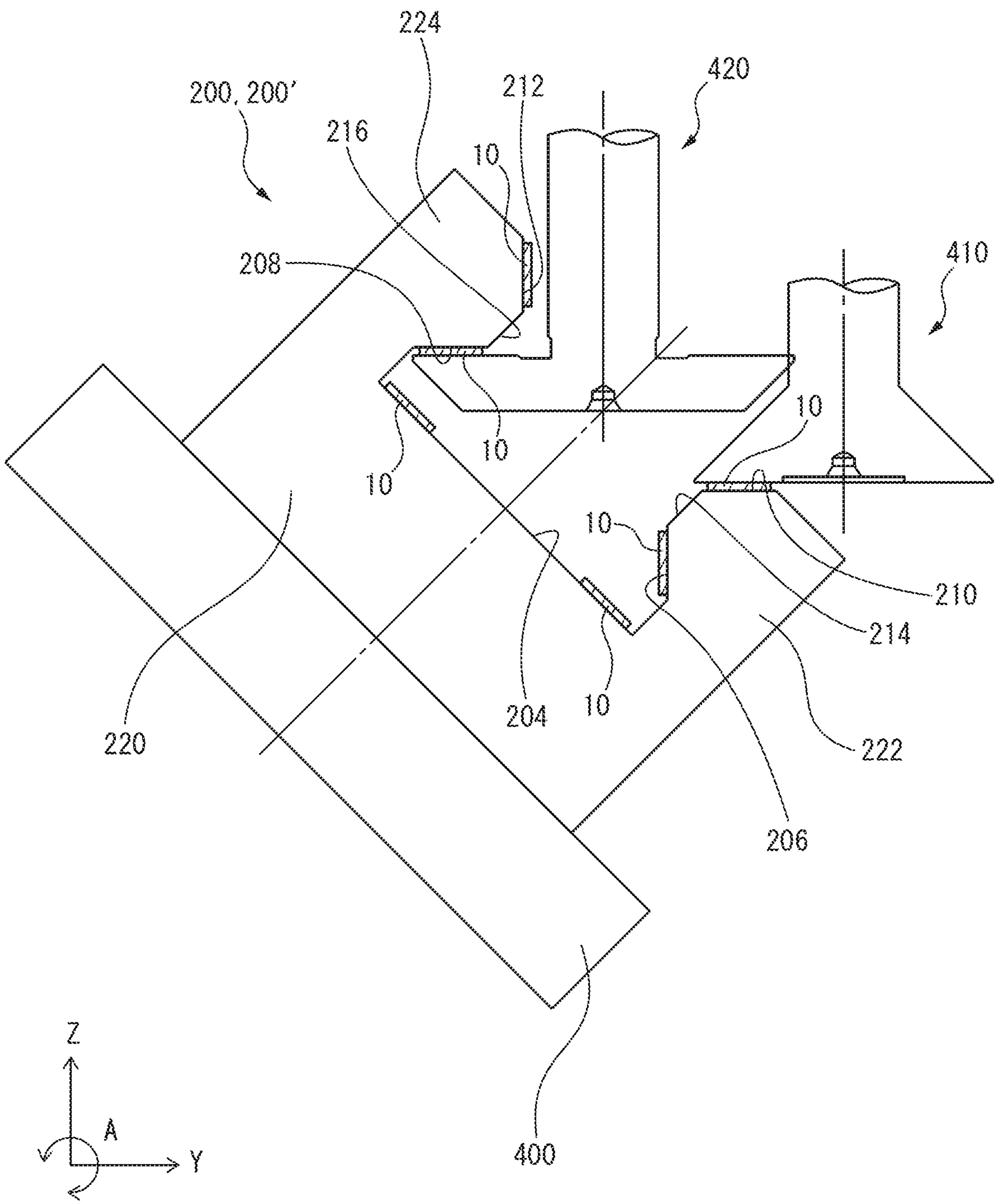
FIG. 15 is a view for detailing the finishing machining of the carriage.

Next, the table 400 is rotationally positioned in the A-axis direction in accordance with the inclination angle of the lower sliding surface 210 formed inside the tip of one of the first and second arms 222, 224 of the carriage 200, 200', and in FIG. 15, the first arm 222, the rotary tool 410 is fed relative to the table 400 in the X-axis direction, and the sliding member 10 of the lower sliding surface 210 is finished by the bottom blades 416 of the rotary tool 410. Next, the rotary tool 410 mounted on the spindle is replaced with the rotary tool 420, the rotary tool 420 is fed relative to the table 400 in the X-axis direction, and the upper blades 426 of the rotary tool 420 finish the sliding member 10 of the upper sliding surface 208 of the second arm 224 on the opposite side. If the inclination angle of the upper sliding surface 208 is different from the inclination angle of the lower sliding surface 210, before finishing the sliding member 10 of the upper sliding surface 208, the table 400 is rotationally positioned in the A-axis direction so as to match the inclination angle of the upper sliding surface 208.

Next, the table 400 is rotationally positioned in the A-axis direction so as to match the incline angle of the upper sliding surface 206 on the side opposite the upper sliding surface 208, the rotary tool 420 is fed relative to the table 400 in the X-axis direction, and the sliding member 10 of the upper sliding surface 206 is finished with the upper blades 426 of the rotary tool 420. Next, the rotary tool 420 mounted on the spindle is replaced with the rotary tool 410, the rotary tool 410 is fed relative to the table 400 in the X-axis direction, and the sliding member 10 of the lower sliding surface 212 is finished by the bottom blades 416 of the rotary tool 410. If the inclination angle of the lower sliding surface 212 is different from the inclination angle of the upper sliding surface 206, before finishing the sliding member 10 of the lower sliding surface 212, the table 400 is rotationally positioned in the A-axis direction so as to match the inclination angle of the lower sliding surface 212.

Furthermore, though the sliding members 10 of the main sliding surface 204, lower sliding surface 210, upper sliding surface 208, upper sliding surface 206, and lower sliding surface 212 are finished in this order in the above description, the present invention is not limited to this order. The order of sliding surfaces to be finished can be appropriately determined in accordance with the conditions on the side of the machine tool used for finishing, the workpiece loading/unloading method, and other conditions. Furthermore, the rotary tools 410 and 420 may be cup grindstones using diamond abrasive grains instead of a face milling cutter.

Figure 4:
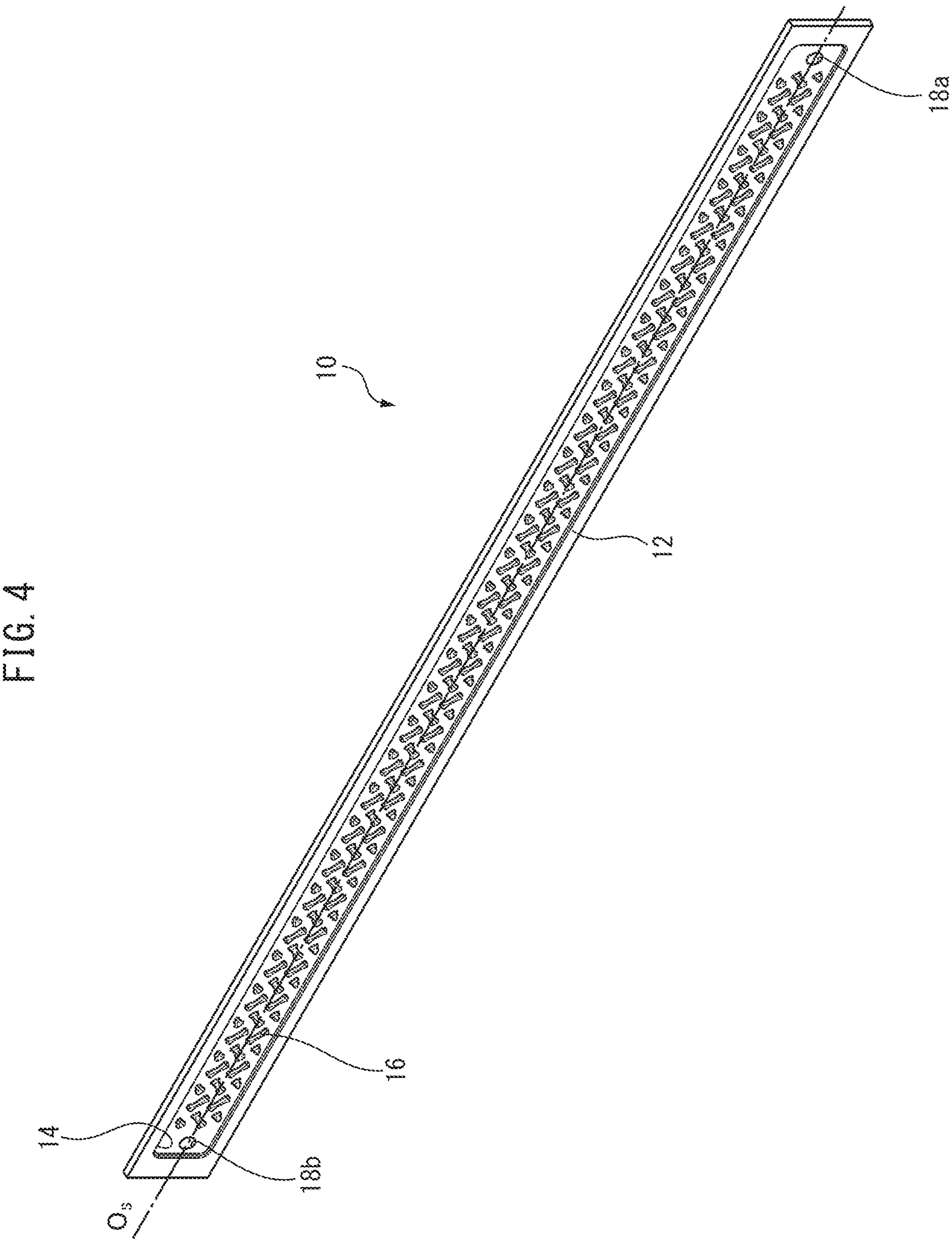
FIG. 4 is a perspective view showing an example of a sliding member used in the sliding linear motion guide device of FIG. 1.
Figure 5:
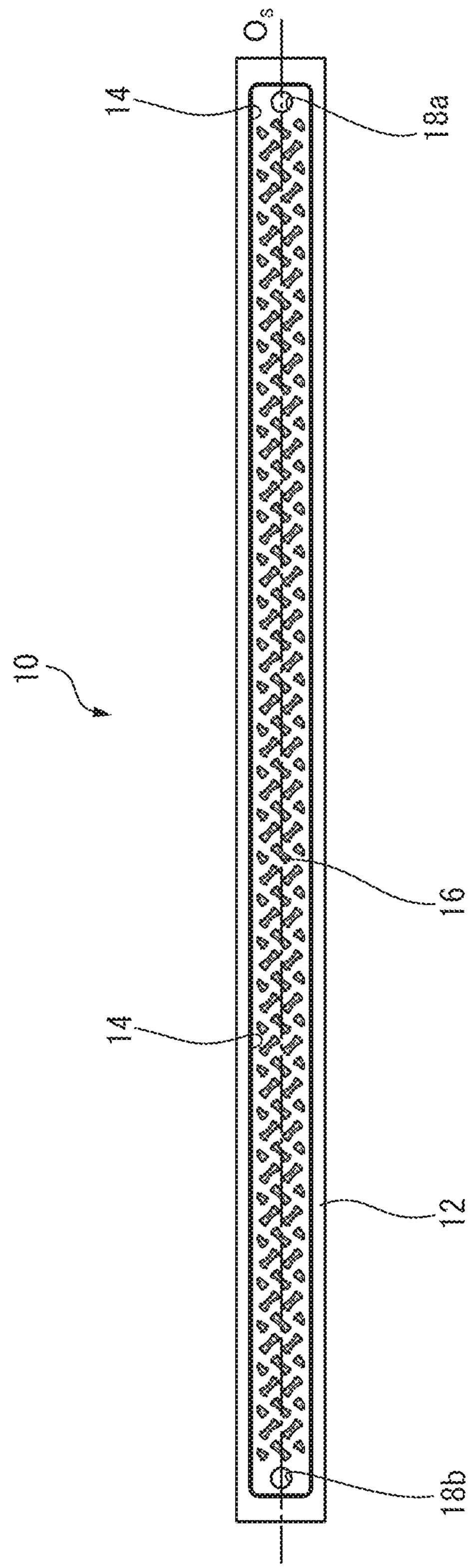
FIG. 5 is a plan view of the sliding member of FIG. 4.

A linear guide system using the sliding linear motion guide device 100 according to the above-described embodiment will be described with reference to FIGS. 21 and 22. In FIGS. 21 and 22, the linear guide system 900 includes a rail 910 and a carriage 902 which reciprocates along a guiding surface 912 of the rail 910. The sliding member 10 shown in FIGS. 4 to 6 is attached to a sliding surface 914 of the carriage 902.

Figure 21:
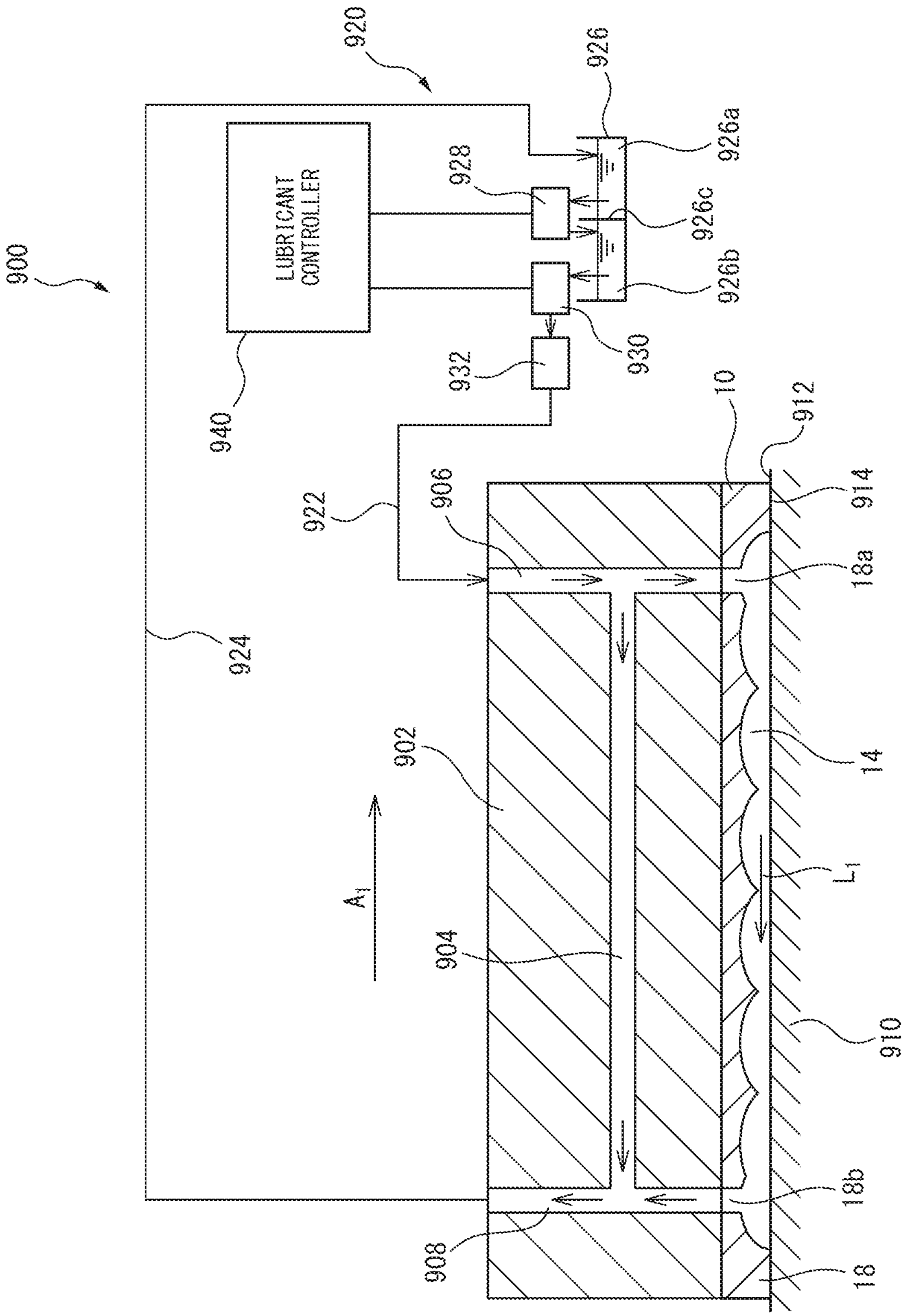
FIG. 21 is a schematic view for detailing the structure and action of a linear guide system using the sliding linear motion guide device of FIG. 1.
Figure 22:
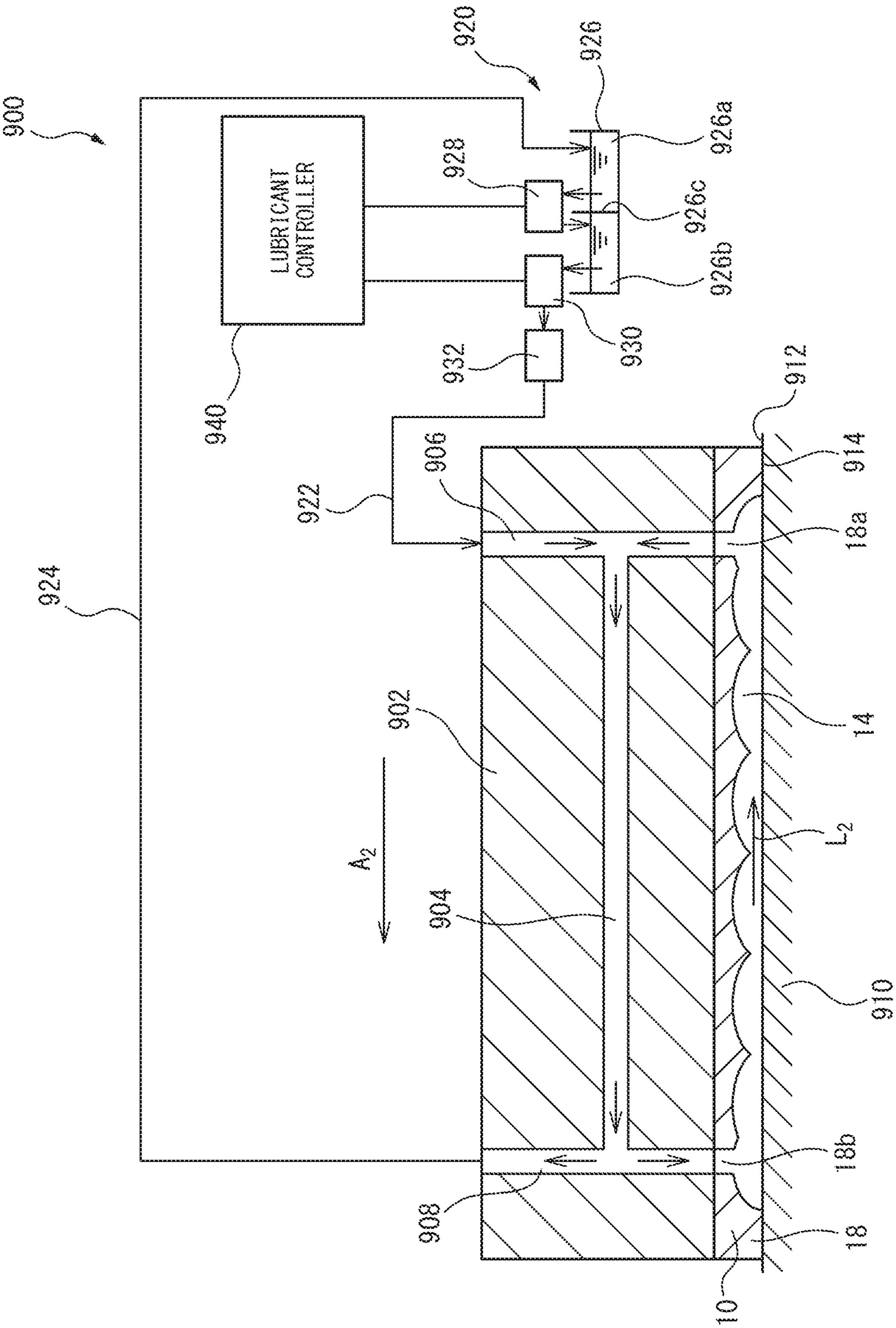
FIG. 22 is a schematic view for detailing the linear guide system while the carriage moves in the direction opposite the case of FIG. 21.

With reference to FIGS. 21 and 22, the rail 910 is formed by the rail 300 in the above-described embodiment. The guiding surface 912 is formed by the main guiding surface 302, upper guiding surfaces 304, 306, and lower guiding surfaces 308, 310. The carriage 902 is formed by the carriage 200, 200'. The sliding surface 914 is formed by the main sliding surface 204, the upper sliding surfaces 206, 208, and the lower sliding surfaces 210, 212.

The carriage 902 has a lubricant return passage 904, a first passage 906, and a second passage 908. The lubricant return passage 904 is formed by the lubricant return passages 230, 232, 242, 244, 254, 256 of the carriage 200, 200'. The first passage 906 is formed by the lubricant supply passages **234*a*, 234*b*; 238*a*, 238*b*; 246*a*, 246*b*; 250*a*. 250*b*; 258*a*, 258*b*; 262*a*, 262*b* of the carriage 200, and the lubricant supply passages 234*a*, 234*b*; 238*a*, 238*b*; 276*a*, 278*a*, 280*a*; 282*a*, 284*a*, 286*a* of the carriage 200'. The second passage 908 is formed by the lubricant discharge passages 236*a*, 236*b*; 240*a*, 240*b*; 248*a*, 248*b*; 252*a*, 252*b*; 260*a*, 260*b*; 264*a*, 264*b* of the carriage 200, and the lubricant discharge passages 236*a*, 236*b*; 240*a*, 240*b*; 276*b*, 278*b*, 280*b*; 282*b*, 284*b*, 286*b* of the carriage 200'**.

Lubricant is supplied from the lubricant supply device 920 to the first passage 906 via a lubricant supply conduit 922, and is recovered from the second passage 908 to the lubricant supply device 920 via the lubricant discharge conduit 924. The lubricant supply device 920 comprises a lubricant tank 926 for storing the lubricant recovered from the sliding members 10 via the second passage 908 and a lubricant discharge conduit 924, a lubricant temperature controller 928 for cooling the lubricant and controlling the temperature so as to be constant, a pump 930 which suctions lubricant from the lubricant tank 926 and pumps lubricant to the first passage 906 via the lubricant supply conduit 922, and an accumulator 932 provided on the discharge side of the pump 930 which attenuates pulses generated in the lubricant by the pump 930. The accumulator 932 may be omitted if a pump with less pulsation is used or if the influence of pulsation is not a problem. The lubricant temperature controller 928 and the pump 930 are controlled by a lubricant controller 940. The lubricant controller 940 can be configured, for example, as part of a machine controller (not illustrated) or an NC device of a machine, such as a machine tool, to which the linear guide system 900 is applied.

Furthermore, the internal space of the lubricant tank 926 is divided into a receiving side tank **926*a* and a supply side tank 926*b* by a partition wall 926*c*, new lubricant and lubricant from the lubricant discharge conduit 924 are stored in the receiving tank 926*a*, lubricant stored in the receiving side tank 926*a* is temperature-controlled by the lubricant temperature controller 928 and stored in the supply side tank 926*b*, and lubricant can be supplied to the carriage 902 from the supply side tank 926*b* by the pump 930**.

When the carriage 902 moves to the first port **18*a* side of the sliding member 10 relative to the rail 910, as indicated by arrow A1 in FIG. 21, the lubricant in the lubricant pocket 14 is moved to the second port 18*b* side of the sliding member 10 relative to the carriage 902, as indicated by arrow L1. As a result, in the lubricant pocket 14, the second port 18*b* side, which is the rear side with respect to the movement direction of the carriage 902, becomes relatively high pressure, and the first port 18*a* side becomes low pressure. Thus, a part of the low temperature lubricant supplied from the lubricant supply device 920 to the first passage 906 via the lubricant supply conduit 922 flows into the lubricant pocket 14 from the first port 18*a*, and the remaining parts circulate in the lubricant return passage 904 towards the second passage 908**.

The lubricant that has flowed into the lubricant pocket 14 circulates in the lubricant pocket 14 toward the second port **18*b*, and is collected from the second port 18*b* to the lubricant supply device 920 via the second passage 908 and the lubricant discharge conduit 924. When the lubricant circulates in the lubricant pocket 14, the lubricant the temperature of which has risen due to the sliding in the lubricant pocket 14 is discharged from the lubricant pocket 14 through the second port 18*b* by the low temperature lubricant newly supplied from the first port 18*a*. The sliding member 10 and the guiding surface 912** are cooled by the replacement action of the lubricant.

When the carriage 902 moves to the second port 18*b* side of the lubricant return passage 904 relative to the rail 910, as indicated by arrow A2 in FIG. 22, the lubricant in the lubricant pocket 14 moves to the first port 18*a* side of the lubricant return passage 904 relative to the carriage 902, as indicated by arrow L2. As a result, in the lubricant pocket 14, the first port 18*a* side, which is the rear side with respect to the movement direction of the carriage 902, becomes relatively high pressure, and the second port 18*b* side becomes low pressure. As a result, the lubricant the temperature of which has risen due to sliding in the lubricant pocket 14 flows out from the first port 18*a* toward the first passage 906, merges with the low temperature lubricant from the first passage 906, is reduced in temperature somewhat, and flows into the lubricant return passage 904. A part of the lubricant circulating in the lubricant return passage 904 flows into the lubricant pocket 14 from the second port 18*b*, and the remaining portions are recovered to the lubricant supply device 920 via the second passage 908 and the lubricant discharge conduit 924.

When the lubricant circulates in the lubricant pocket 14, the lubricant the temperature of which was increased present in the lubricant pocket 14 is ejected from the lubricant pocket 14 through the first port 18*a* by the slightly cooled lubricant newly supplied from the second port 18*b*. The sliding member 10 and the guiding surface 912 are cooled by the replacement action of the lubricant.

According to the present embodiment, the lubricant between the sliding member 10 and the guiding surface 912 can be directly cooled, and the heat generating region of the sliding member 10 and the guiding surface 912 can be directly cooled. Furthermore, since the lubricant is supplied to the lubricant pocket 14 surrounded by the land part 18 formed in the sliding member 10, the amount of lubricant leaking from between the sliding member 10 and the guiding surface 912 is reduced.

Another embodiment of the linear guide system will be described with reference to FIGS. 23 and 24.

Figure 23:
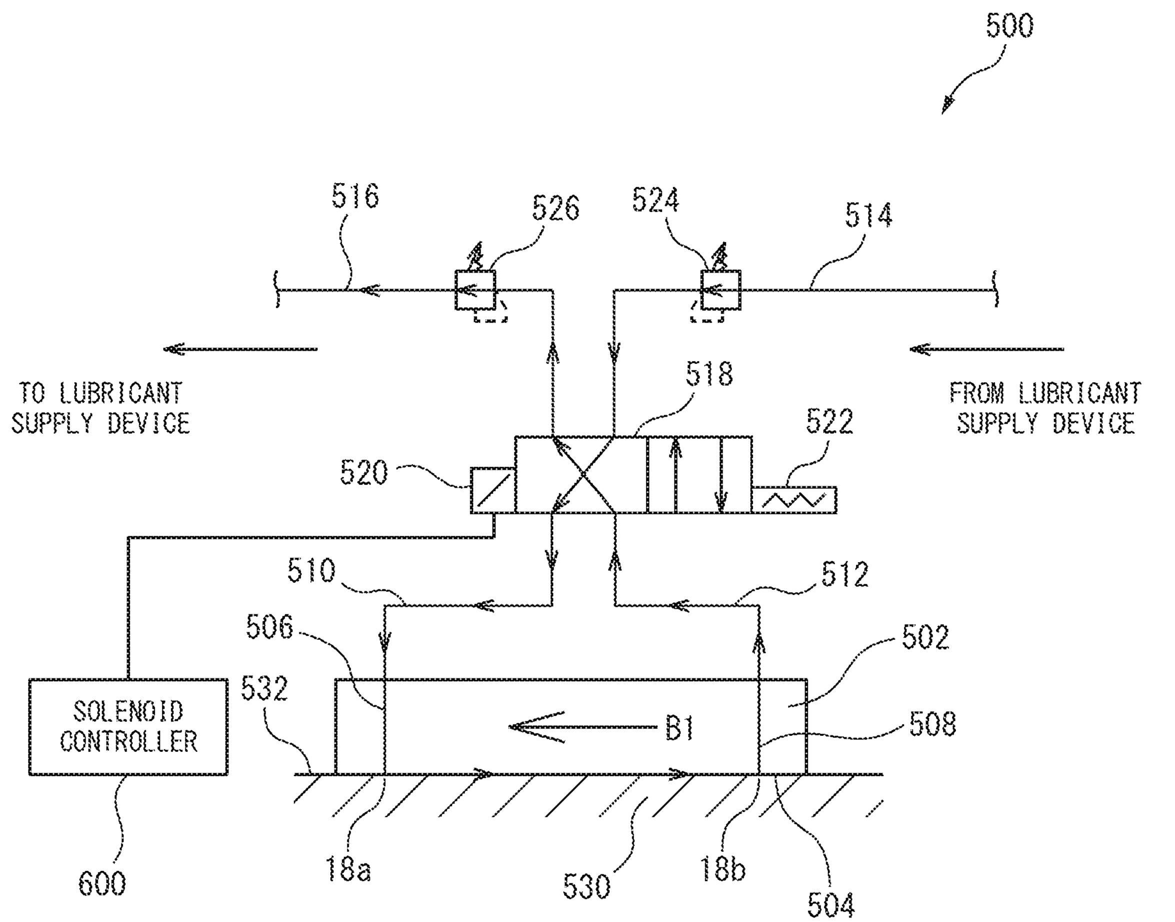
FIG. 23 is a schematic view for detailing the structure and action of another linear guide system using the sliding linear motion guide device of FIG. 1.
Figure 24:
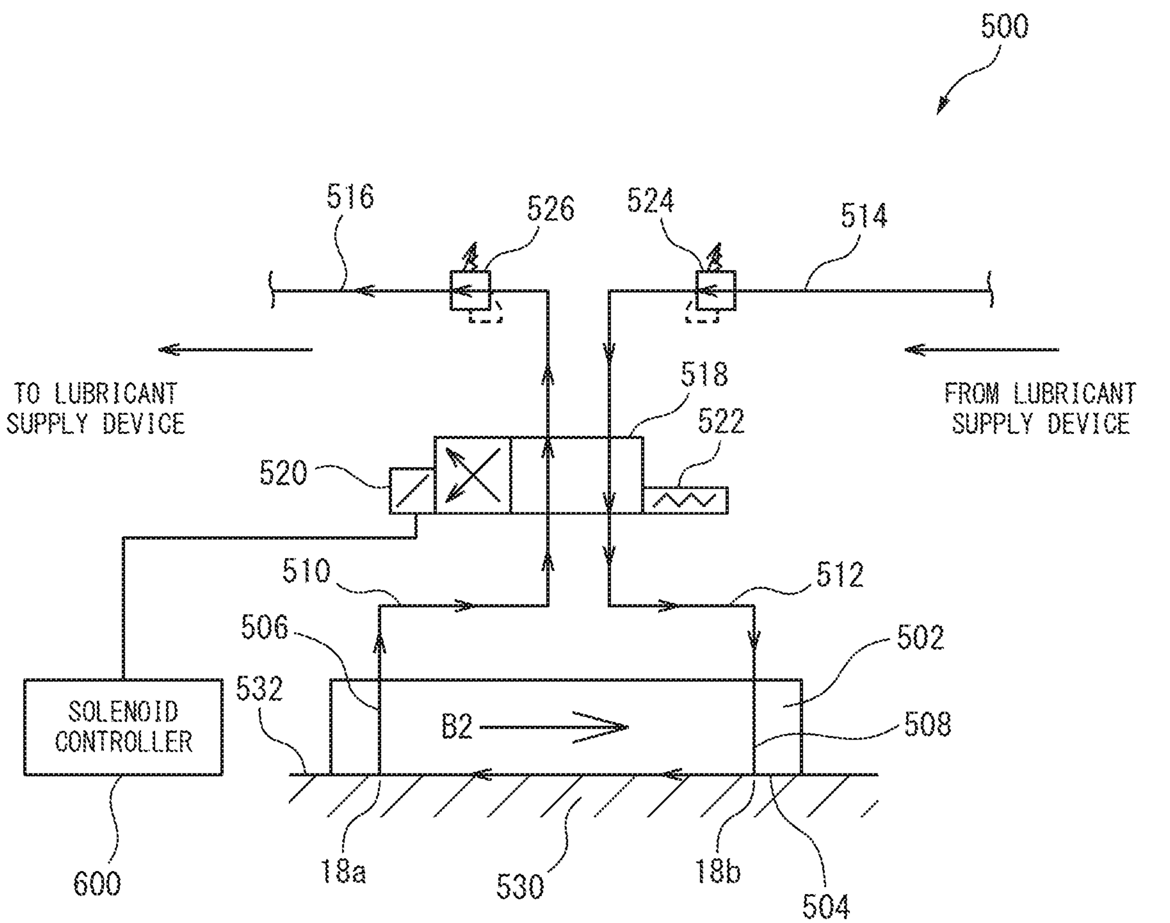
FIG. 24 is a schematic view for detailing the structure and action of the linear guide system while the carriage moves in the direction opposite the case of FIG. 23.

In FIGS. 23 and 24, the linear guide system 500 comprises a rail 530 and a carriage 502 which reciprocates along a guiding surface 532 of the rail 530. The sliding member 10 shown in FIGS. 4 to 6 is attached to a sliding surface 504 of the carriage 502.

The rail 530 is formed by the rail 300 of the embodiment described above. The guiding surface 532 is formed by the main guiding surface 302, upper guiding surfaces 304, 306, and lower guiding surfaces 308, 310. The carriage 502 is formed by the carriage 200, 200'. The sliding surface 504 is formed by a main sliding surface 204, upper sliding surfaces 206, 208, and lower sliding surfaces 210, 212.

The carriage 502 has a first passage 506 which communicates with the first port 18*a* of the sliding member 10, and a second passage 508 which communicates with the second port 18*b* of the sliding member 10. The first passage 506 is formed by the lubricant supply passages 234*a*, 234*b*; 238*a*, 238*b*; 246*a*, 246*b*; 250*a*, 250*b*; 258*a*, 258*b*; 262*a*, 262*b* of the carriage 200, and the lubricant supply passages 234*a*, 234*b*; 238*a*, 238*b*; 276*a*, 278*a*, 280*a*; 282*a*, 284*a*, 286*a* of the carriage 200'. The second passage 508 is formed by the lubricant discharge passages 236*a*, 236*b*; 240*a*, 240*b*; 248*a*, 248*b*; 252*a*, 252*b*; 260*a*, 260*b*; 264*a*, 264*b* of the carriage 200, and the lubricant discharge passages 236*a*, 236*b*; 240*a*, 240*b*; 276*b*, 278*b*, 280*b*; 282*b*, 284*b*, 286*b* of the carriage 200'. The carriage 502 does not comprise a lubricant return passage.

The first and second passages 506, 508 are connected to a switching valve 518 via first and second conduits 510, 512. The switching valve 518 is connected to the lubricant supply device (not illustrated) by a lubricant supply conduit 514 and a lubricant discharge conduit 516. The lubricant supply device can be a lubricant supply device similar to the lubricant supply device 920 of FIGS. 21 and 22.

As an example, the switching valve 518 can be a two-position four-port directional control valve having a solenoid 520. The solenoid 520 is connected to a solenoid controller 600 of the switching valve 518. The solenoid controller 600 can be configured, for example, as part of the lubricant controller 940 for the lubricant supply device 920 of FIGS. 21 and 22, or alternatively, it can be configured as part of a machine controller (not illustrated) or an NC device of a machine, such as a machine tool, to which the linear guide system 900 is applied. When the solenoid 520 is excited by the solenoid controller 600, the switching valve 518 moves from the first position shown in FIG. 23 to the second position shown in FIG. 24. When the solenoid 520 is degaussed, it moves from the second position to the first position by the biasing force of a spring 522.

When the switching valve 518 is in the first position, the first conduit 510 communicates with the lubricant supply conduit 514 and the second conduit 512 communicates with the lubricant discharge conduit 516. When the switching valve 518 is in the second position, the first conduit 510 communicates with the lubricant discharge conduit 516 and the second conduit 512 communicates with the lubricant supply conduit 514.

A pressure reducing valve 524 can be arranged in the lubricant supply conduit 514. The pressure reducing valve 524 can be a pressure control valve which adjusts, for example, the load torque of a feed motor (not illustrated) of a machine to which the linear guide system 500 is applied, for example, a machine tool, or the pressure (backup pressure) of the lubricant supplied to the lubricant pocket 14 in accordance with the load acting on the carriage 502. A back pressure valve 526 can be arranged in the lubricant discharge conduit 516. The back pressure valve 526 can be a pressure control valve which adjusts the pressure so that the pressure in the lubricant pocket 14 (the pressure on the upstream side of the lubricant discharge conduit 516) becomes a predetermined value.

In FIG. 23, when the carriage 502 moves toward the first port 18*a* (direction indicated by the arrow B1) of the sliding member 10, the lubricant in the lubricant pocket 14 is moved relative to the carriage 502 toward the second port 18*b* side of the sliding member 10, in the same manner as the case of FIGS. 21 and 22. At this time, the solenoid controller 600 excites the solenoid 520 and drives the switching valve 518 to the first position. As a result, the hot lubricant in the lubricant pocket 14 is discharged to the lubricant supply device via the second port 18*b*, the second conduit 512, the switching valve 518, and the lubricant discharge conduit 516, and new cold lubricant is supplied from the lubricant supply device into the lubricant pocket 14 via the lubricant supply conduit 514, the switching valve 518, the first conduit 510, and the first port 18*a*. As a result, the sliding member 10 and the guiding surface 532 are cooled.

In FIG. 24, when the carriage 502 moves toward the second port 18*b* (direction indicated by arrow B2) of the sliding member 10, the lubricant in the lubricant pocket 14 moves relative to the carriage 502 toward the first port 18*a* side of the sliding member 10. At this time, the solenoid controller 600 degausses the solenoid 520, and the switching valve 518 is driven to the second position by the biasing force of the spring 522. As a result, the hot lubricant in the lubricant pocket 14 is discharged to the lubricant supply device via the first port 18*a*, the first conduit 510, the switching valve 518, and the lubricant discharge conduit 516, and new cold lubricant is supplied from the lubricant supply device into the lubricant pocket 14 via the lubricant supply conduit 514, the switching valve 518, the second conduit 512, and the second port 18*b*, whereby the sliding member 10 and the guiding surface 532 are cooled.

In the embodiment of FIGS. 21 and 22, when the carriage 902 moves to the first port 18*a* side, more lubricant from the lubricant supply device 920 is supplied to the sliding member 10 than when it moves to the second port 18*b* side in the opposite direction, whereby the temperature in the lubricant pocket 14 is reduced, resulting in temperature non-uniformity in the lubricant pocket with respect to the movement direction of carriage 902.

Conversely, in the embodiment of FIGS. 23 and 24, the switching valve 518 switches the connection between the first and second ports 18*a*, 18*b* of the sliding member 10 between the lubricant supply conduit 514 and the lubricant discharge conduit 516. As a result, since the entire amount of the heated lubricant in the lubricant pocket 14 is discharged from the port on the rear side of the first and second ports 18*a*, 18*b* with respect to the movement direction of the carriage 502, and the entire amount of newly supplied low temperature lubricant is supplied from the port on the front side, the temperature of the lubricant does not change depending on the movement direction of the carriage 502.

Figure 25:
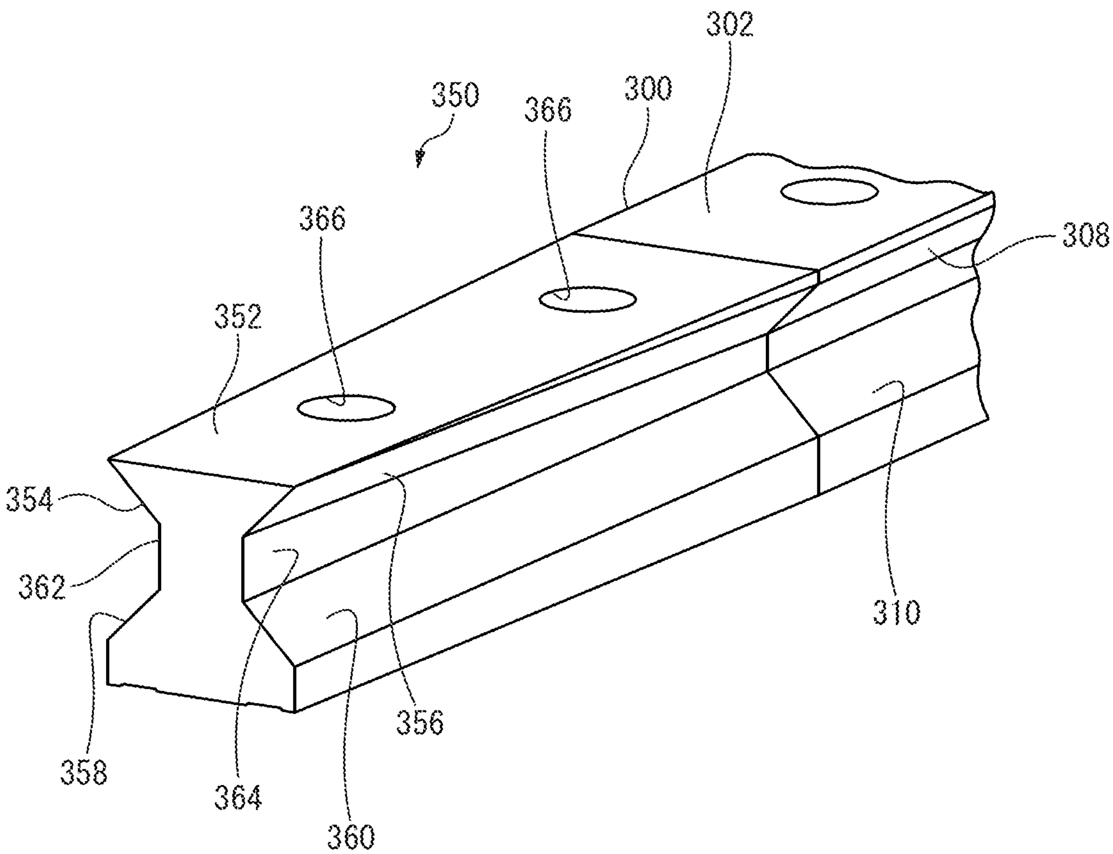
FIG. 25 is a perspective view showing a tapered rail used when assembling the carriage on the rail.
Figure 26:
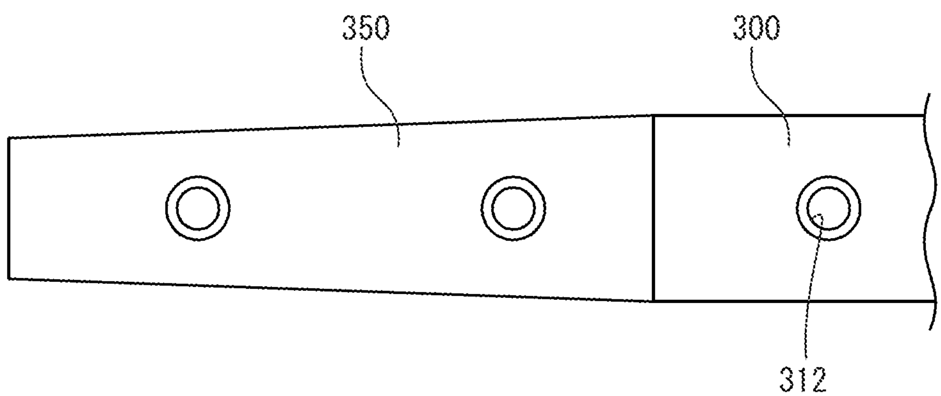
FIG. 26 is a plan view of the tapered rail of FIG. 25.

The present invention is not limited to the embodiments described above. For example, as shown in FIGS. 25 and 26, a tapered rail 350 can be provided at one end of the rail 300. The tapered rail 350 is formed so as to be generally tapered in the direction of the tip opposite the joint with the rail 300. In the same manner as the rail 300, the tapered rail 350 has a main guiding surface 352, upper guiding surfaces 354, 356, lower guiding surfaces 358, 360, and transition surfaces 262, 264.

The main guiding surface 352 of the tapered rail 350 is flush with the main guiding surface 302 of the rail 30) when the tapered rail 350 is joined to the rail 300. The upper guiding surfaces 354, 356, lower guiding surfaces 358, 360, and transition surfaces 262, 264 of the tapered rail 350 are connected to the upper guiding surfaces 304, 306, the lower guiding surfaces 308, 310, and the transition surfaces 322, 324 of the rail 300, respectively, without steps when the tapered rail 350 is joined to the rail 300.

The guide part formed by the upper guiding surfaces 304, 306, the lower guiding surfaces 308, 310, and the transition surfaces 322, 324 of the rail 300 of the tapered rail 350 is formed so as to expand toward the tip of the tapered rail 350.

In the same manner as the rail 300, a plurality of through holes 366 which penetrate the tapered rail 350 perpendicularly to the main guiding surface 352 are formed in the tapered rail 350, and by inserting affixation bolts through the through holes 366 and screwing them into the internal threading of the bolt holes of the support body, the tapered rail 350 can be affixed to the support body. The carriage 200 is inserted from the tapered rail 350 and fitted to the rail 300 with a predetermined fit. The tapered rail 350 is installed outside the nominal stroke of the feed shaft.

Furthermore, the sliding member 10 may wear out after long-term use. When the sliding member 10 wears, the carriages 200, 200' cannot operate smoothly, and the accuracy of positioning of the carriages 200, 200' with respect to the rail 300 is reduced. Thus, in the sliding linear motion guide device 10' according to the embodiment shown in FIGS. 27 and 28, a gib is provided in the carriage so that the position of the carriage with respect to the rail 300 can be adjusted.

Figure 27:
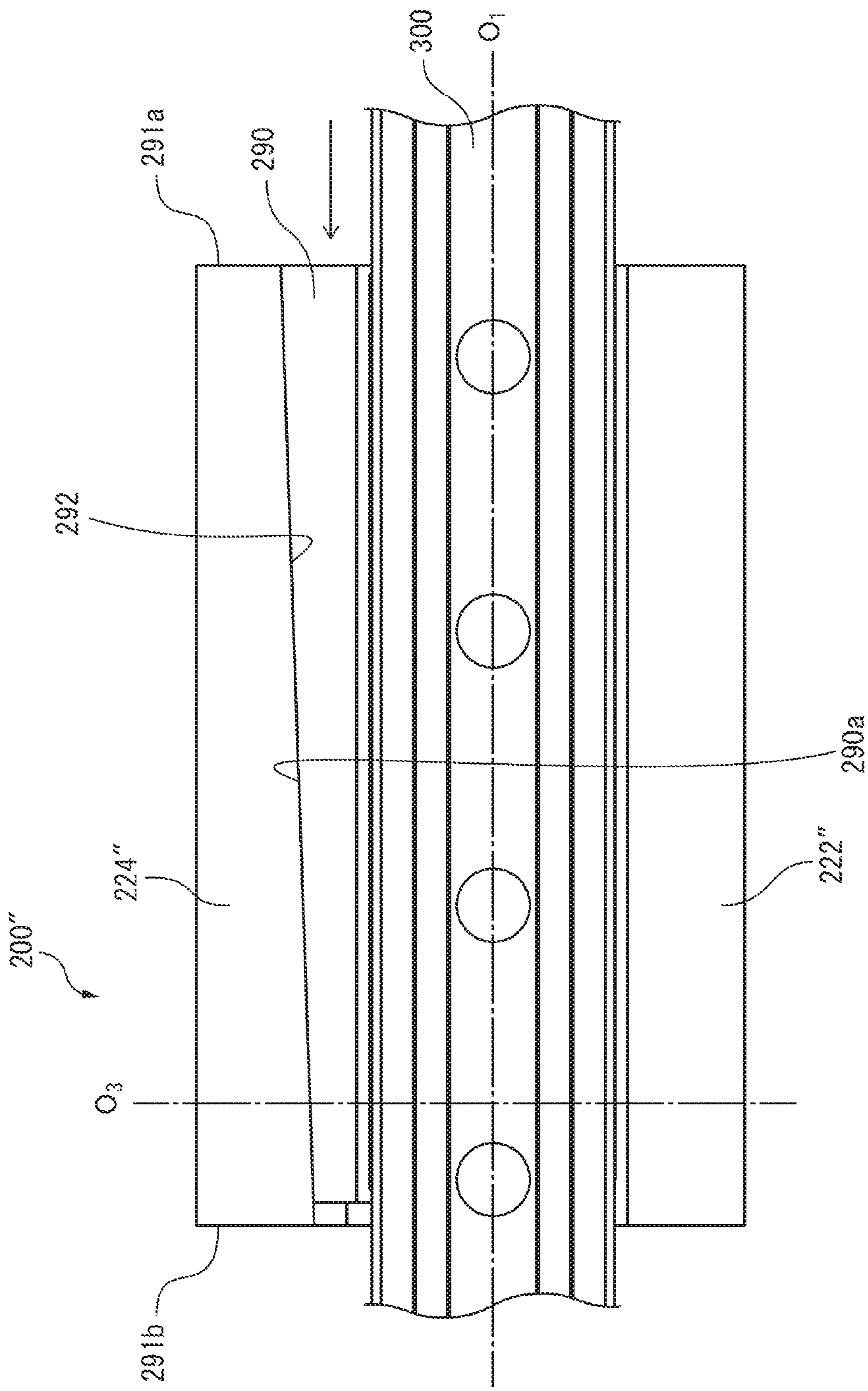
FIG. 27 is a side view of a sliding linear motion guide device according to an embodiment in which the carriage comprises a gib.
Figure 28:
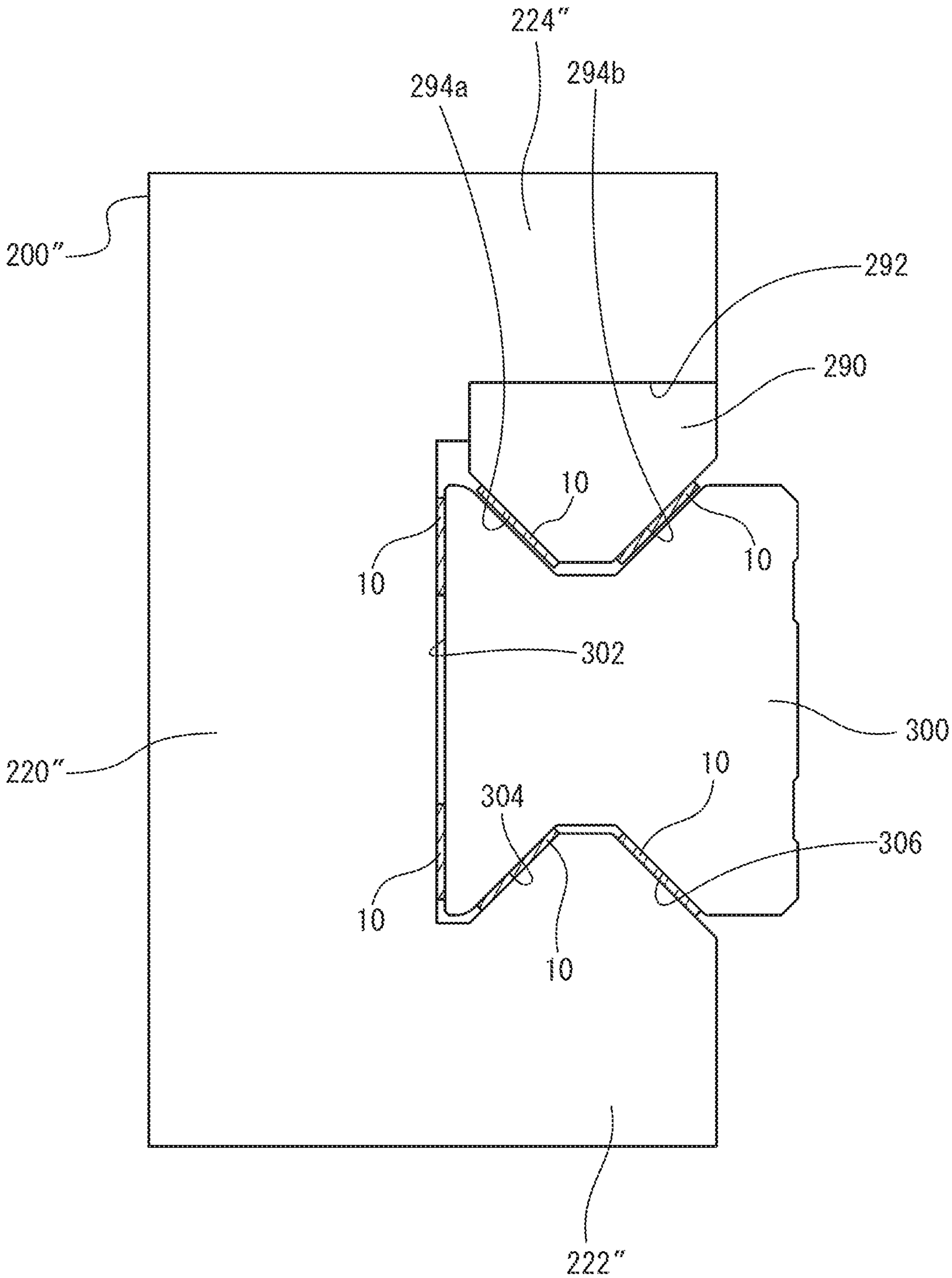
FIG. 28 is an end view of the sliding linear motion guide device of FIG. 27.

In FIGS. 27 and 28, the carriage 200" is a member having a U-shaped cross-section which has a base part 220", and first and second arms 222", 224" which protrude toward the rail 300 from both edges extending in the direction of extension of the rail 300 in the base part 220" One of the first and second arms 222", 224", and in the present embodiment, the second arm 224", is formed with a cutout portion 292 for receiving a gib 290. The sliding linear motion guide device 100" in FIGS. 27 and 28 is suitable for use in the form shown in FIG. 9.

The gib 290 has an upper sliding surface 294*a* and a lower sliding surface 294*b* corresponding to the upper sliding surface 208 and the lower sliding surface 212 of the second arm 224" of the carriage 200". Sliding members 10 are adhered to the upper sliding surface 294*a* and the lower sliding surface 294*b*.

A notch 292 is formed at the tip of the second arm 224" on the side opposite the base part 220" so as to open at least on the side surface (inner side surface) of the rail 300 facing the guide part 330. The notch 292 is formed so as to penetrate from one end portion 291*a* in the central axis O1 direction of the carriage 200" to the other end portion 291*b*.

In particular, the side surface 290*a* facing the guide part of the rail 300 in the notch 292 is inclined from the one end 291*a* to the other end 291*b* so as to linearly approach the rail 300 in the transverse axis O3 direction. In the example of FIG. 27, by pressing the gib 290 from the one end 291*a* side of the carriage 200" toward the other end 291*b*, the gib 290 moves toward the rail 300 in the direction of the transverse axis O3. As a result, the sliding resistance between the carriage 200" and the rail 300 can be adjusted to an appropriate value in accordance with the wear of the sliding member 10.

The lubricant return passages 230, 232, lubricant supply passages 276*a*, 278*a*, 280*a*, and lubricant discharge passages 276*b*, 278*b*, 280*b* of the carriage 200" are also formed in the base part 220" and the first arm 222" of the carriage 200". Though not specifically shown in FIGS. 27 and 28, similar lubricant return passages, lubricant supply passages, and lubricant discharge passages are formed in the gib 290.

In the sliding linear motion guide device 100 according to the above-described embodiment, the rail 300 has a main guiding surface 302, upper guiding surfaces 304, 306, and lower guiding surfaces 308, 310, and a substantially V-shaped guide recess is formed by the upper guiding surfaces 304, 306 and the lower guiding surfaces 308, 310. The present invention is not limited to these forms. Yet another embodiment of the present invention will be described with reference to FIGS. 29 to 31.

Figure 29:
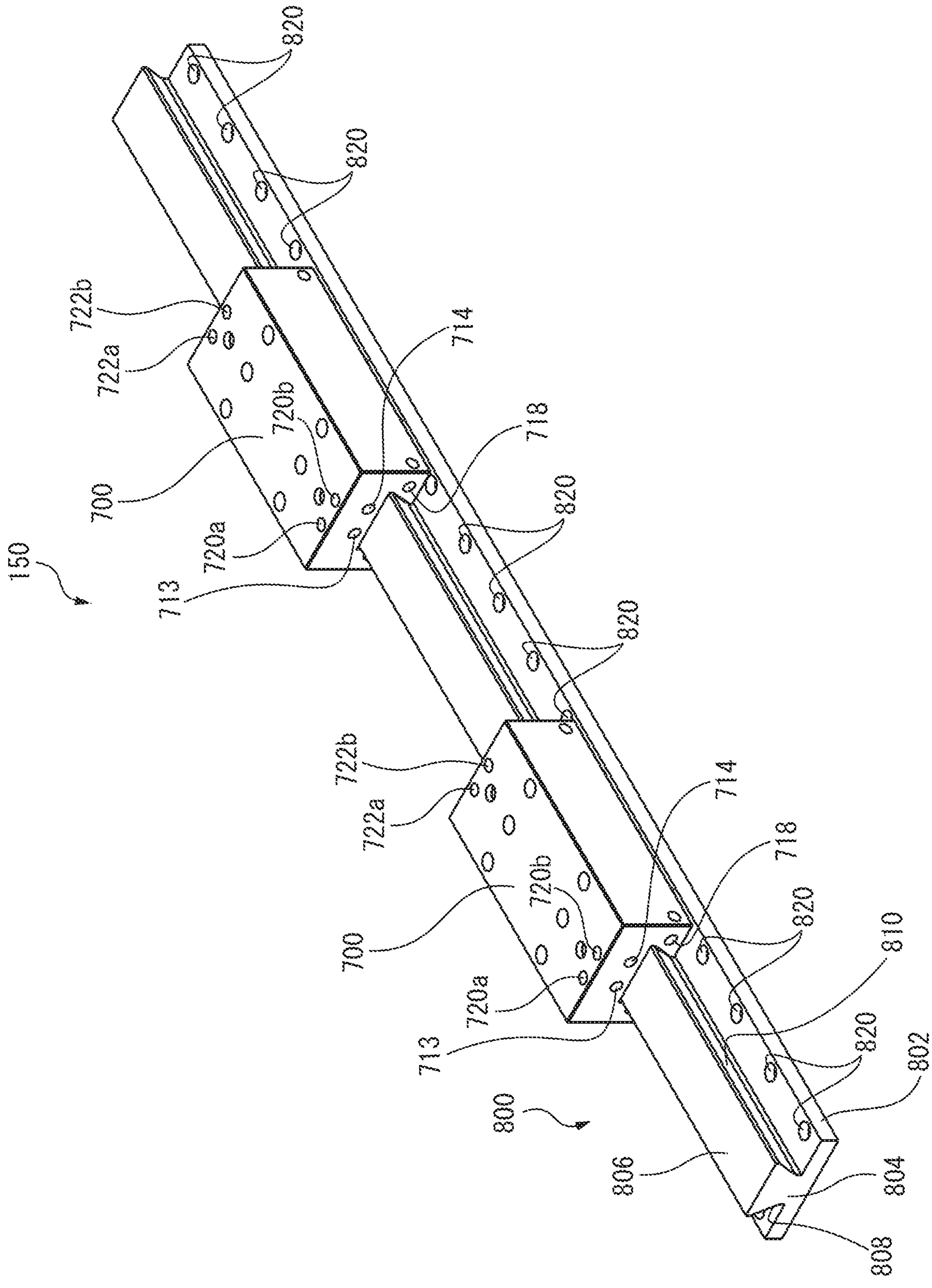
FIG. 29 is a perspective view of a sliding linear motion guide device according to yet another embodiment.
Figure 30:
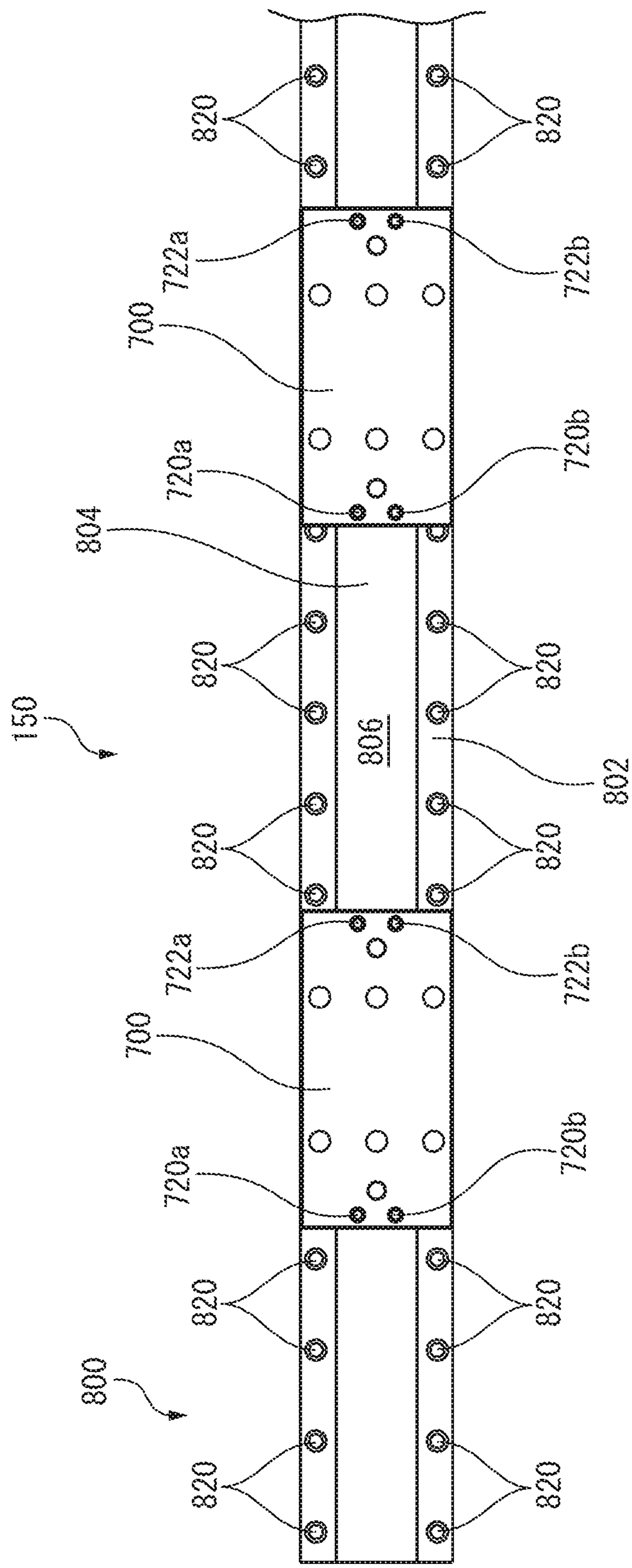
FIG. 30 is a plan view of the sliding linear motion guide device of FIG. 29.
Figure 31:
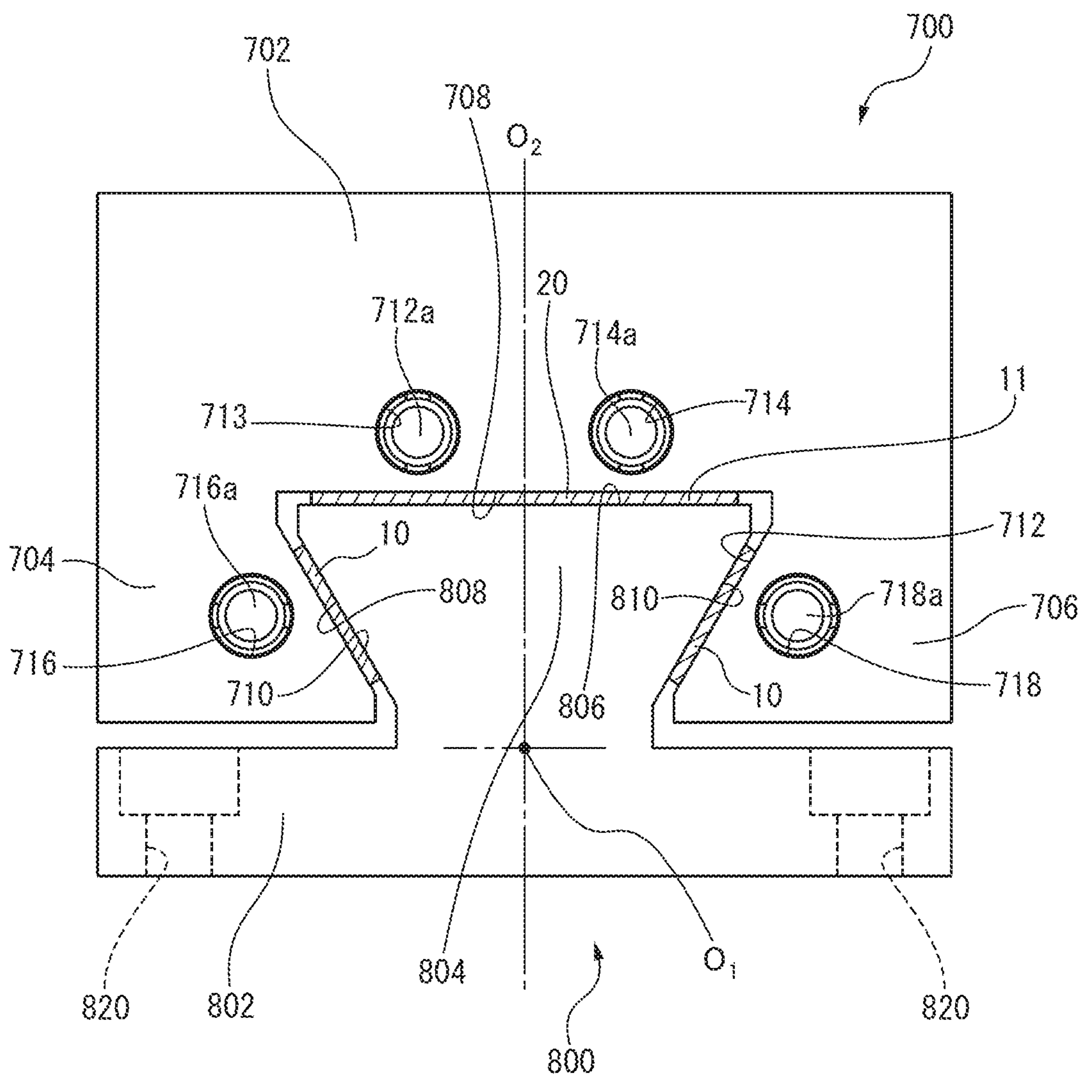
FIG. 31 is an end view of the sliding linear motion guide device of FIG. 30.

In FIGS. 29 to 31, the sliding linear motion guide device 150 comprises a carriage 700 which is guided and reciprocated along a rail 8M. The rail 800 of the sliding linear motion guide device 150 has a base part 802 and a guide part 804 integrally formed with the base part 802. In the guide part 804, a first guiding surface or a main guiding surface 806, second guiding surfaces or upper guiding surfaces 808, 810 are formed, but a lower guiding surface is not formed. A plurality of affixation holes 820 penetrating in the vertical axis O2 direction are formed in the base part 802. The plurality of affixation holes 820 are preferably arranged at equal intervals in the longitudinal direction along the central axis O1.

The carriage 700 is a member having a U-shaped cross section and has a base part 702 and first and second arms 704, 706 which protrude toward the rail 800 from both edges extending in the extending direction of the rail 800 in the base part 702. The base part 702 and the first and second arms 704, 706 form a receiving recess which receives the guide part 804 of the rail 800.

When the carriage 700 is assembled with the rail 800, the base part 702 forms a first sliding surface or main sliding surface 708 facing the main guiding surface 806 of the rail 80. At least two bolt holes (not illustrated) in which internal threading is formed can be formed in the main sliding surface 708.

The first and second arms 704, 706 have respective second sliding surfaces or upper sliding surfaces 710, 712 facing the upper guiding surfaces 808, 810 of the rail 800 when the carriage 700 is assembled with the rail 800. In the present embodiment, the carriage 70) does not have third sliding surfaces or lower sliding surfaces. The upper sliding surfaces 710, 712 extend parallel to the upper guiding surfaces 808, 810, respectively, which face each other when the carriage 700 is assembled to with rail 800.

Figure 32:
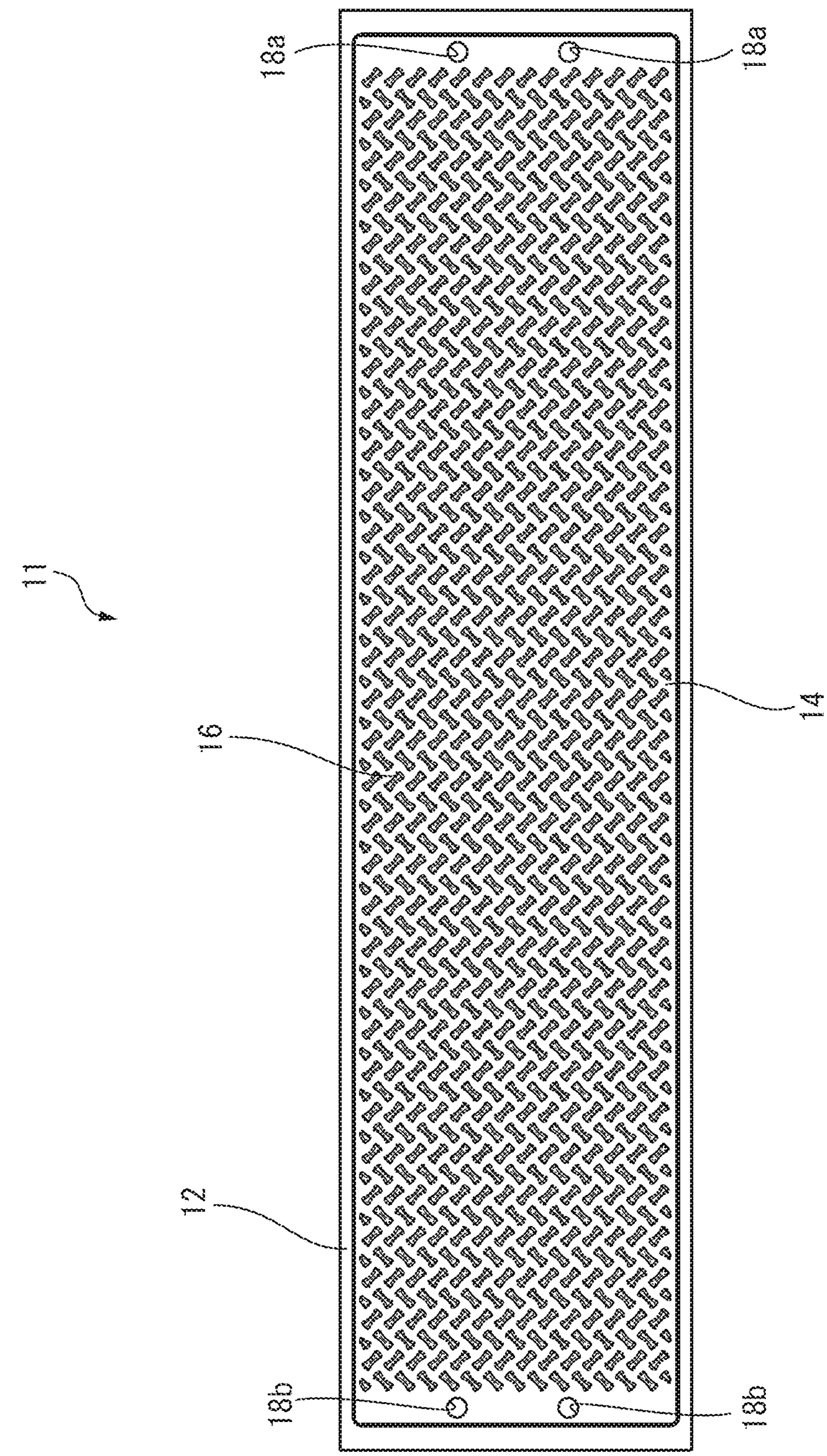
FIG. 32 is a plan view of a wide sliding member that can be used in the sliding linear motion guide device of FIG. 30.

In the present embodiment, though sliding members 10 are adhered to the upper sliding surfaces 710, 712 in the same manner as the embodiments described above, a wide sliding member 11 as shown in FIG. 32 is adhered to the main sliding surface 708. Since the sliding member 11 has a wide width, two of each of the first and second ports 18*a*, 18*b* are provided. The number of the first and second ports 18*a*, 18*b* depends on conditions such as the width of the sliding member, the port diameter, the properties of the lubricant, and the load applied to the carriage, and can be determined so that an appropriate amount of lubricant can be supplied and discharged.

The carriage 700 has lubricant return passages 713, 714, 716, 718 which communicate with the first and second ports 18*a*, 18*b* of each sliding member 10. The carriage 700 further has the same lubricant supply passages 720*a*, 720*b* and lubricant discharge passages 722*a*, 722*b* as the carriages 200, 200'. The lubricant supply passages and lubricant discharge passages are connected to, for example, a lubricant supply device similar to the lubricant supply device 920 shown in FIGS. 21 and 22.

Figure 33:
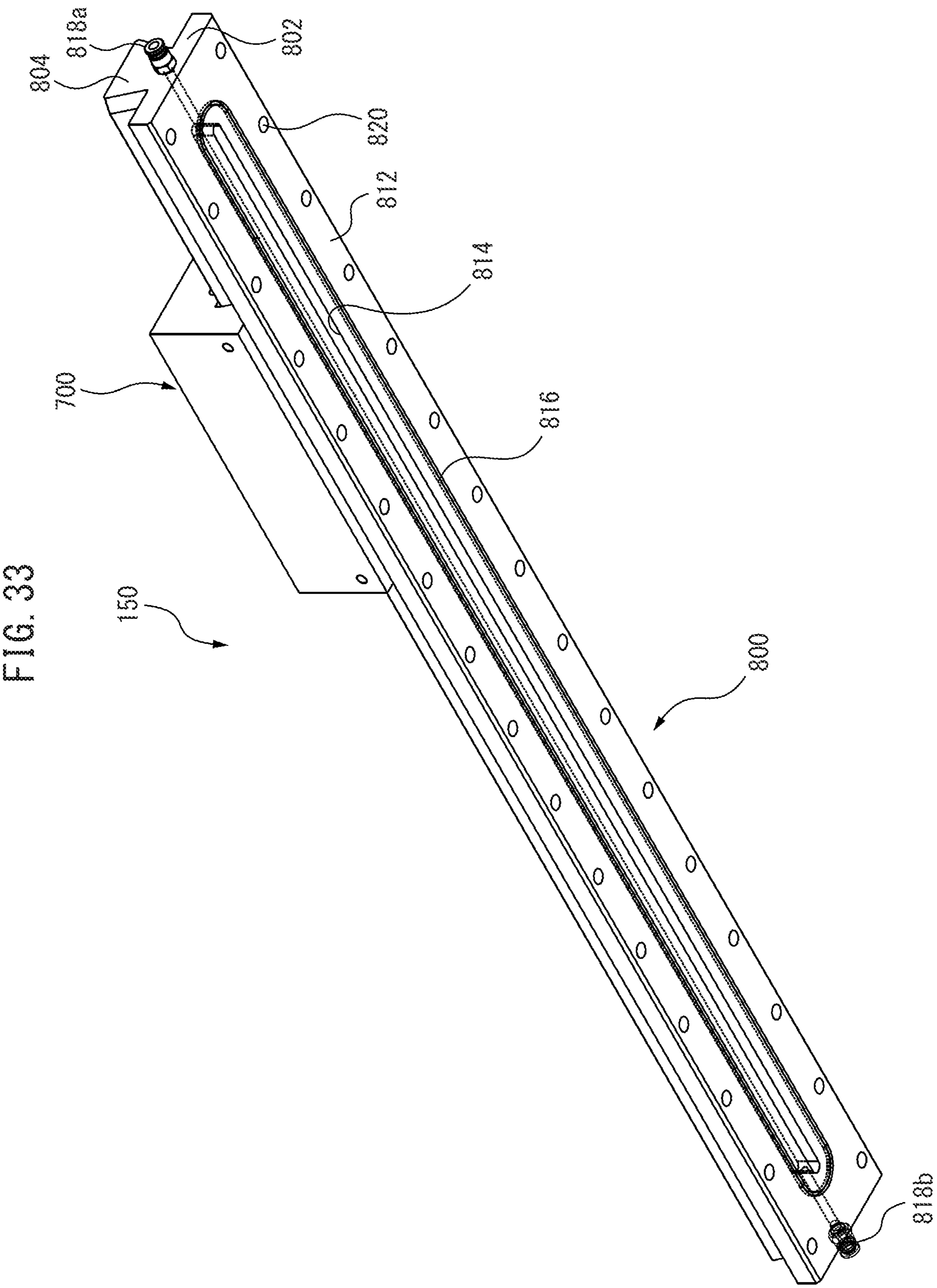
FIG. 33 is a perspective view of the bottom surface of the rail of the sliding linear motion guide device of FIG. 29 as viewed upwardly.

In FIG. 33, a liquid groove 814 is formed in the longitudinal direction in the bottom surface 812 of the rail 800, and the periphery thereof is surrounded by a closed loop-shaped sealing member 816. The bottom surface 812 of the rail 800 is brought into close contact with, for example, the support body of the machine tool, and the rail 800 is affixed by passing bolts through the affixation holes 820. When the carriage 700 slides on the rail 800, heat is generated by friction. The thermal conductivity of the rail 800 is much higher than the thermal conductivity of the sliding members 10, 11 adhered to the carriage 700, and the heat is transferred exclusively to the rail 800, and the mil 800 generates heat. Coolant is introduced from a supply port 818*a* in communication with one end of the liquid groove 814, circulates in the liquid groove 814 in the longitudinal direction, and is collected from a recovery port 818*b* in communication with the other end of the liquid groove 814. The heat generated by the rail 800 is cooled by coolant (not illustrated) circulating in the liquid groove 814, whereby the thermal deformation of the machine tool is reduced.

Figure 34:
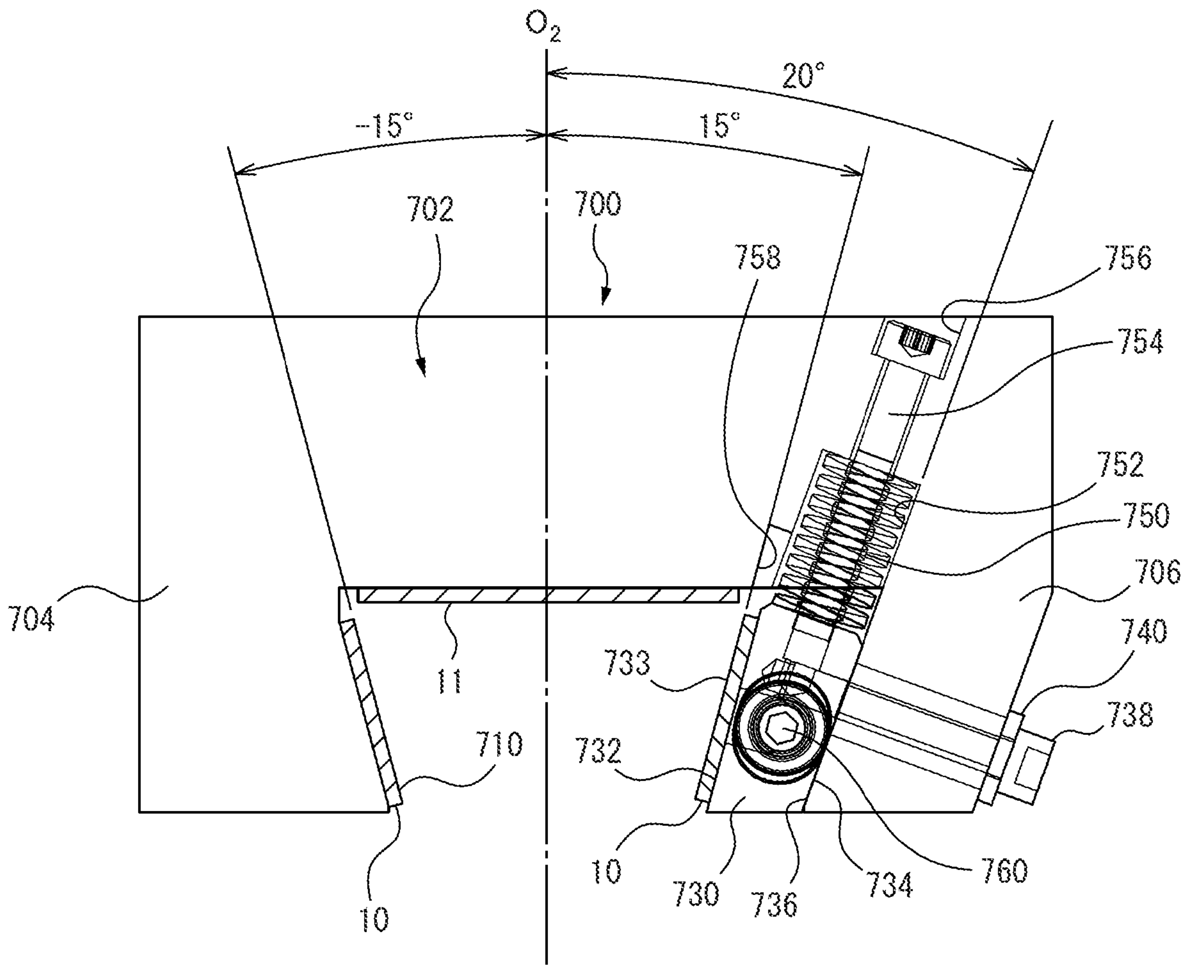
FIG. 34 is an end view of a carriage of an embodiment in which a gib is installed on the sliding linear motion guide device of FIG. 29.
Figure 35:
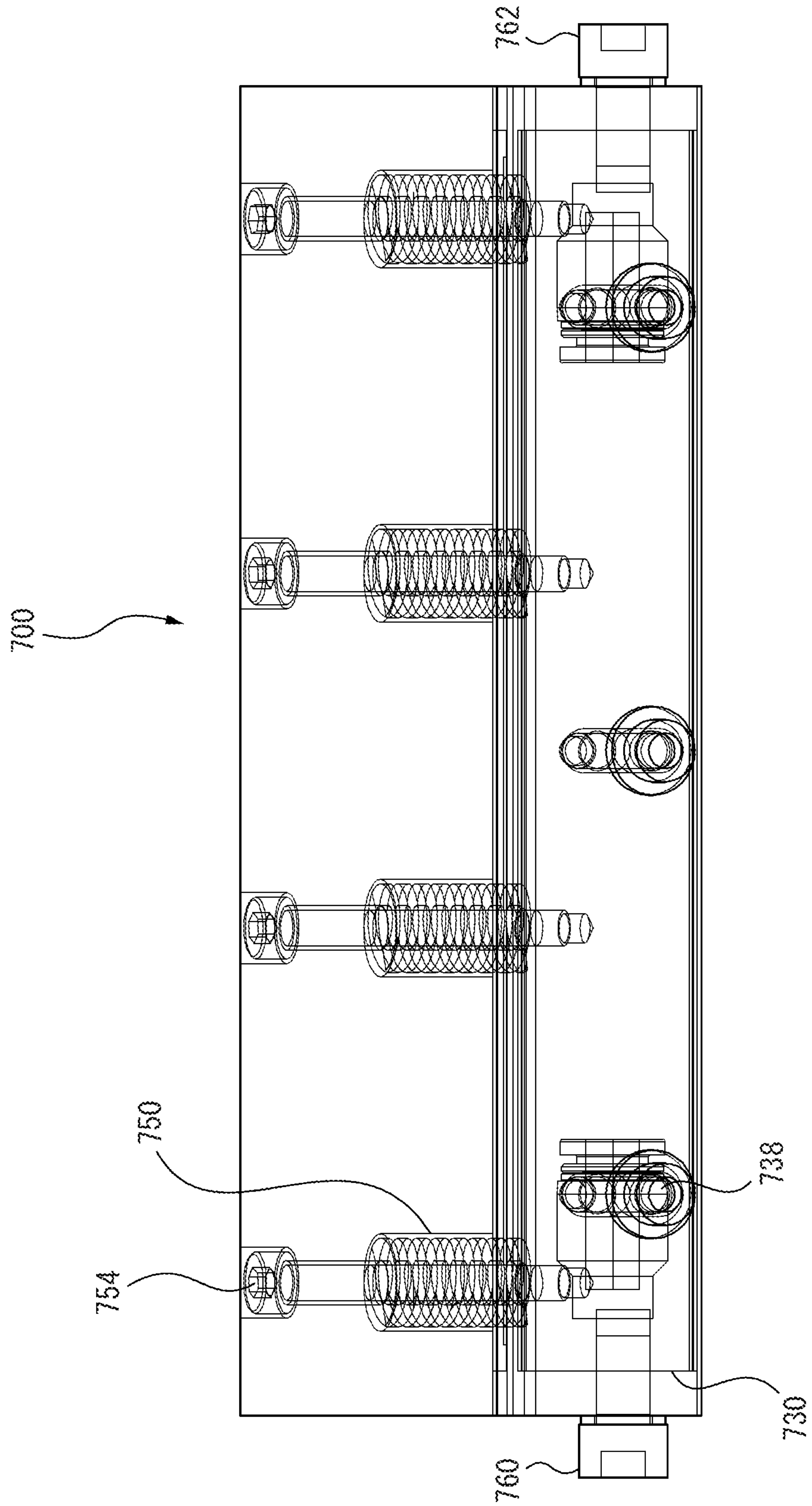
FIG. 35 is a side view of the carriage of the sliding linear motion guide device of FIG. 34.

In FIGS. 34 and 35, a gib 730 is attached to the second arm 706 of the carriage 700 so as to face the first arm 704. In FIG. 34, the surface 732 of the gib 730 which adheres with the sliding member 10 is, for example, inclined by an angle of 15° with respect to the vertical axis O2. The opposite surface 734 of the gib 730 is, for example, inclined by an angle of 20° with respect to the vertical axis O2. Specifically, the gib 730 has a gradient with respect to the depth direction of the incline, and is formed so that its thickness becomes thinner toward the depth direction. The height of the gib 730 is approximately the same as the height of the receiving recess receiving the rail 800. Furthermore, the length of the gib 730 is substantially identical to or slightly shorter than the length of the carriage 700. A sliding member 10 is adhered to the adhesion surface 732 of the gib 730 with adhesive. Note that the upper sliding surface 710 of the first arm 704 of the carriage 700 is inclined by an angle of −15° with respect to the vertical axis O2, and the sliding surface 733 of the gib 730 is symmetrical with the upper sliding surface 710 with respect to the vertical axis O2.

In FIG. 34, a gib receiving surface 736 which is inclined by an angle of 20° with respect to the vertical axis O2 is formed on the second arm 706 of the carriage 700, and the opposite surface 734 of the gib 730 is in close contact with the gib receiving surface 736. Bolts 738 penetrate and are screwed into the opposite surface 734 of the gib 730 perpendicular to the opposite surface 734 from the outside of the second arm 706 of the carriage 700. The through holes of the bolts 738 of the second arm 706 are formed as long holes having a large diameter in the vertical direction, and when the bolts 738 at three locations in the longitudinal direction are tightened via washers 740, the gib 730 is affixed to the carriage 700.

Further, the gib 730 is continuously biased by a compression spring 750 in the depth direction of the inclination. The compression spring 750 is housed in a spring chamber 752 formed in the carriage 700, and a bolt 754 which penetrates the compression spring 750 and is screwed into the gib 730 holds the gib 730 by pulling it up from the counterbore 756 on the upper surface of the carriage 700. Compression springs 750 and bolts 754 are provided at four locations in the longitudinal direction. When the bolts 738 are loosened and the bolts 754 are tightened against the biasing force of the compression springs 754, the gib 730 rises along the gib receiving surface 736 and the opening of the receiving recess widens. In this case, it becomes easy to assemble the carriage 700 with the rail 800 without using the tapered rail 350 of the embodiment described above. After the carriage 700 is assembled with the rail 800 in this manner, the bolts 754 are loosened, and the tightening torque of the bolts 754 is adjusted so that the gib 730 is in close contact with the rail 800 and has an appropriate sliding resistance. The bolts 738 are then tightened. A recess 758 is formed in the carriage 700 so as to enable rising of the gib 730.

The sliding surface 733 of the gib 730 has a lubricant pocket, a first passage, and a second passage in the same manner as the upper sliding surface 710, and further has a lubricant return passage, a lubricant supply conduit, and a lubricant discharge conduit. Note that fluid couplings 760, 762 are a port from the pump to the lubricant supply conduit and a port from the lubricant discharge conduit to the outside, respectively. The machining of the sliding surface 733 of the sliding member 11 is performed in accordance with the dimensions of the rail 800 in a state where the bolts 754 are tightened with a predetermined torque, the bolts 738 is tightened, and the gib 730 is affixed to the carriage 700. By using the gib 730 in such a form, when the sliding resistance changes due to aging, the tightening torque of the bolt 754 can be adjusted by loosening the bolts 738, whereby the gib 730 is pressed downward by the biasing force of the compression spring 750, and an appropriate sliding resistance can be easily obtained.

The invention claimed is:

1. A sliding linear motion guide device which is attached between a support body and a moving body, the device comprising:

a rail which extends in a movement direction of the moving body and which comprises at least a first guiding surface extending in the movement direction, and two second guiding surfaces which are provided inclined with respect to the first guiding surface and which extend in the movement direction, a carriage which is capable of reciprocating in the movement direction and which has a receiving recess for receiving at least a part of the rail, the carriage comprising a first sliding surface facing the first guiding surface of the rail when a part of the rail is received in the receiving recess, and two second sliding surfaces which face the respective two second guiding surfaces, wherein one of the two second sliding surfaces is defined in a gib having a gradient with respect to a depth direction, which is a direction perpendicular from the first sliding surface toward the rail, such that thickness reduces as depth progresses, a plate-shaped sliding member is provided on each of the first and second sliding surfaces, each of the sliding members having a lubricant pocket composed of a recess having a perimeter surrounded by a land part, and a plurality of convex parts, which contact the first and second guiding surfaces of the rail when a part of the rail is received in the receiving recess, being formed in the lubricant pockets, a first passage formed in the carriage so as to be open into the lubricant pocket at one end of each of the sliding members in a reciprocation direction of the carriage, and a second passage formed in the carriage so as to be open into the lubricant pocket on the side opposite the one end into which the first passage is open in the lubricant pocket of each of the sliding members.

2. The sliding linear motion guide device according to claim 1, wherein the carriage has a lubricant return passage formed so as to communicate with the first and second passages.

3. The sliding linear motion guide device according to claim 2, wherein the first passage is connected to a pump of a lubricant supply device via a lubricant supply conduit and the second passage is connected to a tank of the lubricant supply device via a lubricant discharge conduit.

4. The sliding linear motion guide device according to claim 1, wherein the first and second passages are connected, via a switching valve, to a lubricant supply conduit connected to a pump of a lubricant supply device and are connected to a lubricant discharge conduit connected to a tank of the lubricant supply device, and by the switching valve, the second passage is connected to the lubricant discharge conduit when the carriage moves so that the first passage is in front in the movement direction and the first passage is connected to the lubricant discharge conduit when the carriage moves such that the second passage is in front in the movement direction.

5. The sliding linear motion guide device according to claim 1, wherein a liquid groove for circulating coolant is formed in in a bottom surface of the rail in the longitudinal direction.

6. A method for adhering a sliding member to a carriage of a sliding linear motion guide device according to claim 1, the method comprising the steps of:

preparing a first jig having a first pressing surface provided so as to be capable of facing the first sliding surface of the carriage and having a positioning recess formed for receiving and positioning the sliding member, arranging the sliding member in the positioning recess so that a rear surface of the sliding member protrudes from the positioning recess, applying an adhesive to the rear surface of the sliding member, arranging the first pressing surface of the first jig so as to face the first sliding surface of the carriage, pressing the rear surface of the sliding member in the positioning recess against the first sliding surface by affixing the first jig to the carriage with a bolt, and loosening the bolt after the adhesive has hardened and removing the first jig from the carriage.

* * * * *